United States Patent
Starr et al.

(10) Patent No.: US 12,510,649 B2
(45) Date of Patent: *Dec. 30, 2025

(54) CAMERA AND PROJECTILE DETECTOR SYSTEMS AND DEVICES FOR BALLISTIC PARAMETER MEASUREMENTS OF A PROJECTILE IN A TARGET VOLUME

(71) Applicant: SensorMetrix, San Diego, CA (US)

(72) Inventors: Anthony F. Starr, San Diego, CA (US); Tatiana N. Starr, San Diego, CA (US); Darren R.F. Schurig, Huntington Beach, CA (US)

(73) Assignee: SensorMetrix, San Diego, CA (US)

( * ) Notice: Subject to any disclaimer, the term of this patent is extended or adjusted under 35 U.S.C. 154(b) by 925 days.

This patent is subject to a terminal disclaimer.

(21) Appl. No.: 17/714,084

(22) Filed: Apr. 5, 2022

(65) Prior Publication Data
US 2022/0413118 A1  Dec. 29, 2022

Related U.S. Application Data

(60) Provisional application No. 63/215,219, filed on Jun. 25, 2021.

(51) Int. Cl.
 *G01S 13/58* (2006.01)
 *G06T 7/70* (2017.01)
(52) U.S. Cl.
 CPC ............... *G01S 13/58* (2013.01); *G06T 7/70* (2017.01); *G06T 2207/30241* (2013.01)

(58) Field of Classification Search
 CPC .......... G01S 13/58; G01S 5/16; G01S 13/867; G01S 11/12; G06T 7/70;
 (Continued)

(56) References Cited

U.S. PATENT DOCUMENTS

| | | |
|---|---|---|
| 3,727,069 A | 4/1973 | Crittenden et al. |
| 4,267,443 A | 5/1981 | Carroll et al. |

(Continued)

FOREIGN PATENT DOCUMENTS

| | | |
|---|---|---|
| EP | 0862041 | 9/1998 |
| EP | 0899585 | 3/1999 |
| WO | WO 2020/068277 | 4/2020 |

OTHER PUBLICATIONS

English translation of EP 0862041 A1, published Sep. 2, 1998.*
(Continued)

*Primary Examiner* — Xuemei G Chen
(74) *Attorney, Agent, or Firm* — Fish & Richardson P.C.

(57) ABSTRACT

A ballistic detection system includes a projectile detector; electromagnetic radiation detection equipment; and a ballistics analysis computer configured to obtain image data captured by first and second cameras in accordance with timing specified by the projectile detector, determine points in three-dimensional space, which correspond to image artifacts of a projectile, using intrinsic and extrinsic parameters of the first and second cameras, define a trajectory of the projectile within a target volume using the points in three-dimensional space, and optionally find a point of intersection of the trajectory of the projectile with an object associated with the target volume.

20 Claims, 11 Drawing Sheets

(58) Field of Classification Search
CPC .. G06T 2207/30241; F41A 31/02; F41G 3/26; F41G 3/2694; F41J 9/14; G01C 11/06; G01C 11/02
See application file for complete search history.

(56) References Cited

U.S. PATENT DOCUMENTS

| | | | |
|---|---|---|---|
| 5,577,733 | A | 11/1996 | Downing |
| 6,021,975 | A | 2/2000 | Livingston |
| 8,378,279 | B2 | 2/2013 | Mourar et al. |
| 9,217,864 | B2 | 12/2015 | Bell et al. |
| 9,360,283 | B1 | 6/2016 | Tejada et al. |
| 10,401,497 | B2 | 9/2019 | Winker et al. |
| 10,514,239 | B2 | 12/2019 | Winker et al. |
| 10,538,326 | B1 | 1/2020 | Cui et al. |
| 2005/0163343 | A1* | 7/2005 | Kakinami ............ G06V 20/586 382/103 |
| 2013/0063715 | A1 | 3/2013 | Boeckem et al. |
| 2013/0083330 | A1 | 4/2013 | Piana |
| 2013/0336583 | A1 | 12/2013 | Ernst et al. |
| 2014/0002617 | A1* | 1/2014 | Zhang ................. H04N 13/243 348/48 |
| 2014/0022170 | A1 | 1/2014 | Koeppe |
| 2016/0127642 | A1 | 5/2016 | Schechner et al. |
| 2017/0138710 | A1 | 5/2017 | Sullivan |
| 2017/0200277 | A1* | 7/2017 | Keat ....................... G06T 7/248 |
| 2018/0249135 | A1* | 8/2018 | Yeo .......................... G01S 13/58 |
| 2018/0322671 | A1* | 11/2018 | Song ....................... G06T 7/246 |
| 2019/0064310 | A1 | 2/2019 | Tsang et al. |
| 2019/0128665 | A1* | 5/2019 | Harendt ................. G06T 7/593 |
| 2019/0186876 | A1 | 6/2019 | Howe |
| 2019/0306408 | A1* | 10/2019 | Hofer .................... H04N 23/90 |
| 2019/0371003 | A1* | 12/2019 | Lin ............................ G06T 7/70 |
| 2019/0391254 | A1* | 12/2019 | Asghar .................. H04N 23/60 |
| 2020/0174169 | A1 | 6/2020 | Engelen et al. |
| 2020/0398138 | A1* | 12/2020 | Hendrix ................ A63F 13/812 |
| 2021/0125349 | A1* | 4/2021 | Song ........................ G01S 5/16 |
| 2021/0298590 | A1* | 9/2021 | Ayvali ..................... A61B 34/30 |
| 2021/0341264 | A1* | 11/2021 | Starr .......................... F41J 5/02 |
| 2022/0284628 | A1* | 9/2022 | Tuxen .................... H04N 23/69 |
| 2022/0345631 | A1* | 10/2022 | Qu .......................... H04N 23/64 |
| 2022/0413119 | A1* | 12/2022 | Starr ..................... G01S 7/4808 |
| 2023/0347209 | A1* | 11/2023 | Oh ......................... G01B 11/00 |

OTHER PUBLICATIONS cse.unr.edu/~bebis/CS791E/, [online] "Stereo Vision", Lecture notes from Computer Science Department of University of Nevada, Reno, Apr. 15, 2004, retrieved from URL <https://www.cse.unr.edu/~bebis/CS791E/Notes/StereoCamera.pdf>, 7 pages.
hackaday.com, [online] Charvat, "Guest Post: Try Radar for Your Next Project", Feb. 24, 2014, retrieved on Nov. 29, 2016, retrieved from URL <https://hackaday.com/2014/02/24/guest-post-try-radar-for-your-next-project/>, 23 pages.
High Pressure Instrumentation, B590 Optical Target System, https://www.hpi-gmbh.com/index.php/standard-ballistic/product/view/2/16, May 14, 2021, 1 page.
High Pressure Instrumentation, B590-TS Optical Target System—Technical Data, Aug. 2019, 1 page.
Kongsberg OpticScore, Kongsberg Target Systems, Jul. 2018, 1 page.
Li et al., "Ground target localization algorithm for semi-active laser terminal correction projectile", Defence Technology 12 (2016) 234-241.
Li et al., "Projective Two-dimensional Coordinate Measurement Method Based on Optical Fiber Coding Fire and its Coordinate Distribution Probability", Measurement Science Review, vol. 13, No. 1, 2013, pp. 34-38.
Lu et al., "Electro-Optics Target For Position and Speed Measurement", Proc. SPIE vol. 981, High Speed Photography, Videography, and Photonics VI (1988), 6 pages.
Roland et al., "Measuring the Blast and Ballistic Performance of Armor", Naval Research Laboratory, NRL/FR/6126-15-10,284, Oct. 15, 2015, 19 pages.
Theissen Training Systems Brochure, Live Fire—Train as You Fight, Electronic Scoring Systems & Equipment, 2015, 28 pages.
TS 723 target system, Drello Ballistics, Technical Data, Jul. 2018, 2 pages.
Wikipedia, Gun chronograph, https://en.wikipedia.org/wiki/Gun_chronograph., Aug. 6, 2019, 3 pages.
Extended European Search Report in European Appln No. 22169235.3, dated Mar. 23, 2023, 19 pages.
Extended European Search Report in European Appln No. 22169235.3, dated Oct. 17, 2022, 14 pages.
Office Action in U.S. Appl. No. 17/714,088, dated Jun. 4, 2024, 15 pages.
Stancic et al., "Active IR system for projectile detection and tracking," Advances in Electrical and Computer Engineering, Nov. 2017, 17(4):125-130.
Partial European Search Report in European Appln No. 22169241.1, dated Nov. 2, 2022, 16 pages.
Extended European Search Report in European Appln No. 22169241.1, dated Sep. 25, 2023, 18 pages.

\* cited by examiner

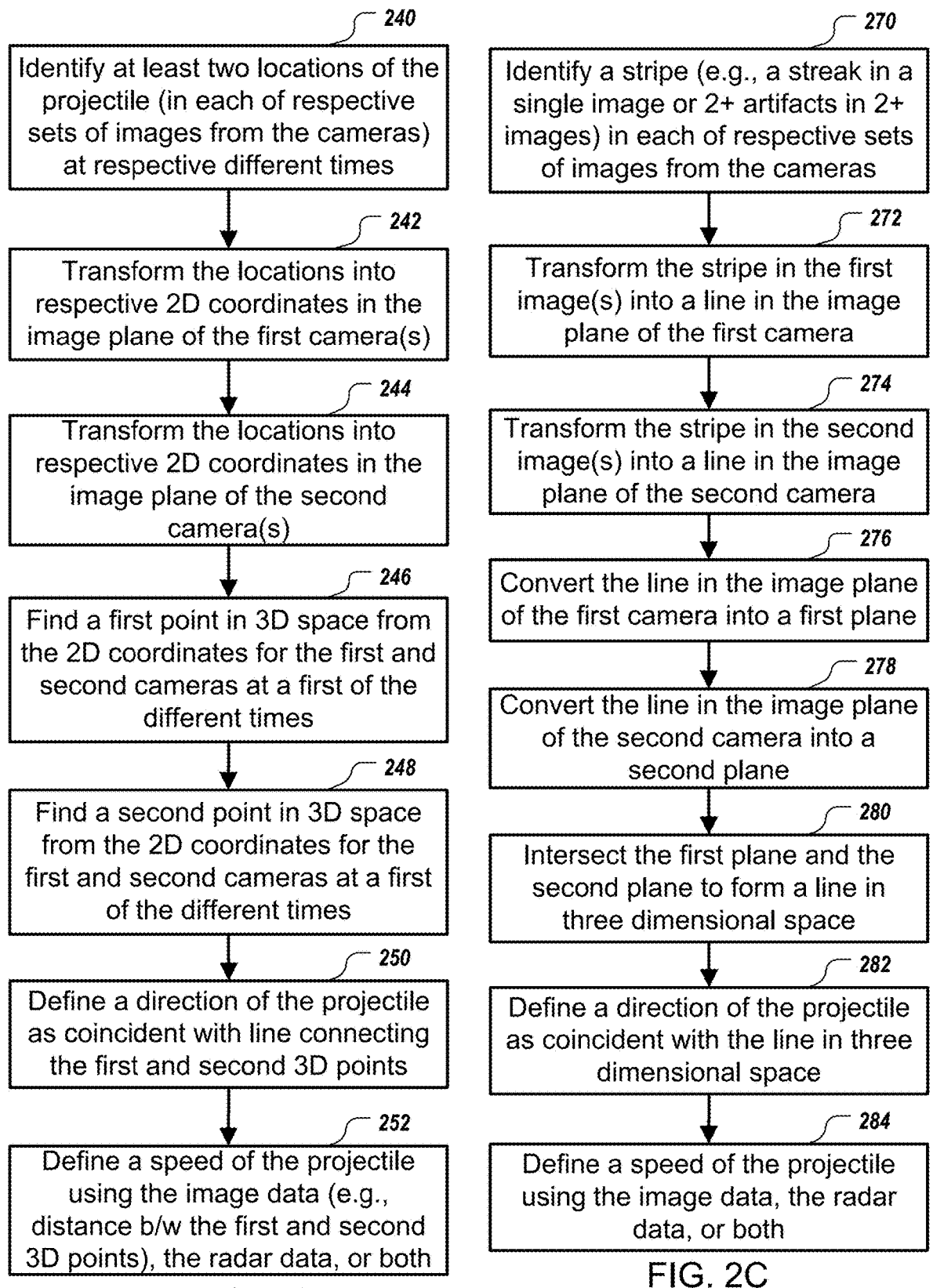

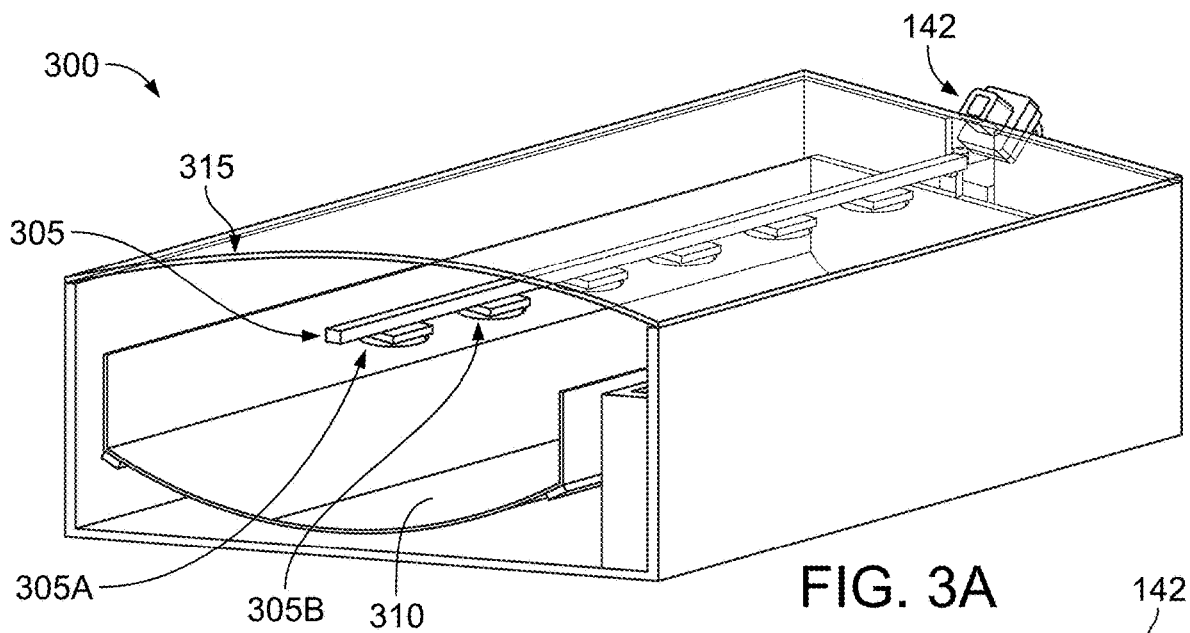
FIG. 3A
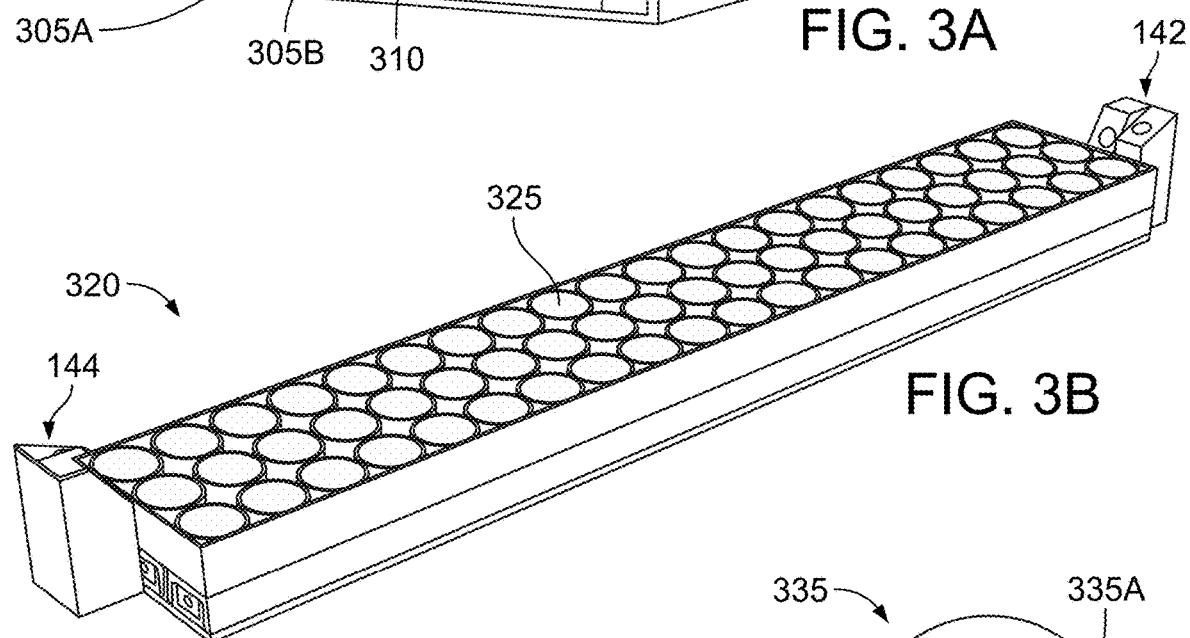
FIG. 3B
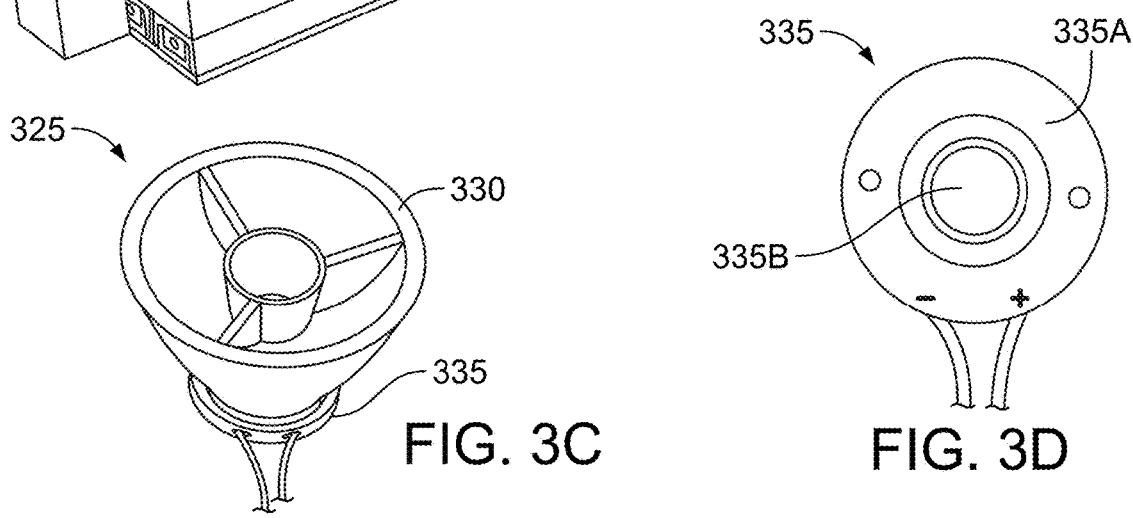
FIG. 3C
FIG. 3D

400

405
410

CAMERA AND PROJECTILE DETECTOR SYSTEMS AND DEVICES FOR BALLISTIC PARAMETER MEASUREMENTS OF A PROJECTILE IN A TARGET VOLUME

CROSS-REFERENCE TO RELATED APPLICATIONS

This application claims the benefit under 35 U.S.C. § 119(e) of U.S. Patent Application No. 63/215,219, entitled "CAMERA AND RADAR SYSTEMS AND DEVICES FOR BALLISTIC PARAMETER MEASUREMENTS FROM A SINGLE SIDE OF A TARGET VOLUME", filed Jun. 25, 2021.

STATEMENT AS TO FEDERALLY SPONSORED RESEARCH

This invention was made with government support under contract number W900KK-20-0014 awarded by the U.S. Army Contracting Command, Charlie Division. The government has certain rights in the invention.

BACKGROUND

This specification relates to measurements of ballistic parameters of munitions, including the measurement of a munition's trajectory through a target volume of space.

The U.S. Army provides the world's most realistic training and testing solutions for the U.S. Department of Defense. Part of that effort includes the use of live fire training of many types of weapons from small arms to larger ground and vehicle launched munitions. An important aspect of assessing the training exercises is determining the location of ballistic penetration or point of impact (POI) of the munitions. Assessment is further enhanced if other ballistic parameters, such as the trajectory, caliber and velocity, can be determined as well. Further, systems and techniques for measuring the location of a munition's arrival on a defined virtual surface, the munition's trajectory, and/or its caliber are described in WO 2020/068277, entitled, "Optical Systems and Devices for Ballistic Parameter Measurements", published 2 Apr. 2020.

SUMMARY

The present disclosure relates to camera-based systems and devices for ballistic parameter(s) measurements. The systems and techniques detailed in this application can provide a non-contact method of making such measurements, where no contact of the munition with a target or other physical object is necessary for the measurement to be made. In general, innovative aspects of the technologies described herein can be implemented in one or more of the following embodiments of a ballistic detection system.

In general, one or more aspects of the subject matter described in this specification can be embodied in a ballistic detection system including: a radar system; electromagnetic radiation detection equipment positioned on only a single side of a target volume, the electromagnetic radiation detection equipment being communicatively coupled with the radar system, and the electromagnetic radiation detection equipment including a first camera arranged with respect to the target volume to view the target volume from a first perspective defined by a first position and a first orientation of the first camera, and a second camera arranged with respect to the target volume to view the target volume from a second perspective, the second perspective defined by a second position and a second orientation of the second camera; and a ballistics analysis computer communicatively coupled with the electromagnetic radiation detection equipment, wherein the ballistics analysis computer is configured to obtain image data captured by the first and second cameras in accordance with timing specified by radar data from the radar system, determine at least two points in three-dimensional space using intrinsic and extrinsic parameters of the first and second cameras, wherein the at least two points in three-dimensional space correspond to image artifacts of a projectile detected in the image data, the intrinsic parameters of the first camera characterize transformation between image plane coordinates and pixel coordinates for the first camera, the intrinsic parameters of the second camera characterize transformation between image plane coordinates and pixel coordinates for the second camera, and the extrinsic parameters of the first and second cameras relate the first perspective and the second perspective to each other, define a trajectory of the projectile within the target volume using the at least two points in three-dimensional space, and find a point of intersection of the trajectory of the projectile with an object associated with the target volume.

The ballistics analysis computer can be configured to: determine the at least two points by being configured to identify the image artifacts of the projectile in the image data including at least two image locations in each of a first set of one or more images from the first camera and a second set of one or more images from the second camera, wherein each of the at least two image locations correspond to a different time, transform the at least two image locations in the first set of one or more images into respective two dimensional coordinates in the image plane of the first camera using the intrinsic parameters of the first camera, transform the at least two image locations in the second set of one or more images into respective two dimensional coordinates in the image plane of the second camera using the intrinsic parameters of the second camera, find a first point of the at least two points in three-dimensional space using a first of the two dimensional coordinates in the image plane of the first camera, a first of the two dimensional coordinates in the image plane of the second camera, and the extrinsic parameters of the first and second cameras in relation to the position and orientation of one or both of the first and second cameras in three-dimensional space, and find a second point of the at least two points in three-dimensional space using a second of the two dimensional coordinates in the image plane of the first camera, a second of the two dimensional coordinates in the image plane of the second camera, and the extrinsic parameters of the first and second cameras in relation to the position and orientation of one or both of the first and second cameras in three-dimensional space; and define the trajectory of the projectile by being configured to define a direction of the projectile as coincident with a line connecting the first point with the second point.

The first set of one or more images can be a single first image from the first camera, the second set of one or more images can be a single second image from the second camera, and the at least two image locations can be a beginning location and an ending location of a streak of image artifacts in each of the single first image and the single second image. The first set of one or more images can be at least two first images, the second set of one or more images can be at least two second images, and the at least two image locations can be first locations of image artifacts in respective ones of the at least two first images and second locations of image artifacts in respective ones of the at least two second images.

The ballistics analysis computer can be configured to define a speed of the projectile using the radar data, using a distance between the first point and the second point in three-dimensional space divided by a difference between a time of the first point and a time of the second point, or using both the radar data and the distance.

The ballistics analysis computer can be configured to: determine the at least two points by being configured to identify the image artifacts of the projectile in the image data including a stripe in each of a first set of one or more images from the first camera and a second set of one or more images from the second camera, transform the stripe in the first set of one or more images into a line in the image plane of the first camera using the intrinsic parameters of the first camera, convert the line in the image plane of the first camera into a first plane, transform the stripe in the second set of one or more images into a line in the image plane of the second camera using the intrinsic parameters of the second camera, convert the line in the image plane of the second camera into a second plane, and intersect the first plane and the second plane to form a line in three-dimensional space that includes the at least two points; and define the trajectory of the projectile by being configured to define a direction of the projectile as coincident with the line in three-dimensional space, and define a speed of the projectile using the image data, the radar data, or both.

The stripe in each of the first set of one or more images from the first camera and the second set of one or more images from the second camera can be an image streak corresponding to the projectile. The stripe in each of the first set of one or more images from the first camera and the second set of one or more images from the second camera can be a series of image impressions corresponding to the projectile.

The first camera can have a first circular buffer, the second camera can have a second circular buffer, the ballistics analysis computer can include a projectile detector analysis computer and a trajectory analysis computer, and the radar system can include: at least one antenna; and the projectile detector analysis computer configured to stop image capturing by the first and second cameras, and to trigger obtaining of the image data from the first and second circular buffers for processing by the trajectory analysis computer, in response to the timing being calculated from signals from the at least one antenna.

The ballistics analysis computer can be configured to find the point of intersection as a point of impact of the projectile with a target surface of the object. The object can be a physical target having a three-dimensional shape, and the target surface can be a three-dimensional surface of the physical target.

The electromagnetic radiation detection equipment can include: a lighting system including one or more light emitters configured and arranged to illuminate the target volume with light having a first bandwidth straddling a first wavelength; and a passband filter between the target volume and an image sensor of each of the first and second cameras, wherein the passband filter has a second bandwidth straddling a second wavelength, the second wavelength is included in the first bandwidth straddling the first wavelength, and the second bandwidth is smaller than first bandwidth. The first bandwidth can be wider than the second bandwidth by an amount selected to account for shifting of light emission spectrum of the one or more light emitters that results from variations in temperature, shifting of light filtering spectrum of the passband filter that results from variations in angle of light incidence, or both.

At least one camera of the first and second cameras can have an associated device configured and arranged to block a solar disc in a field of view of the one camera. The device can include an arcuate solar disc blocking piece attached at a pivot point that provides a first axis of rotation perpendicular to an optical axis of the at least one camera, wherein the device has a second axis of rotation parallel with the optical axis of the at least one camera, and a position of the arcuate solar disc blocking piece is adjustable by rotations about the first and second axes to align the arcuate solar disc blocking piece with an ecliptic of the sun in relation to a lens of the at least one camera. The device can include a motorized actuator coupled with a solar blocking piece, and the motorized actuator can be configured to move the solar blocking piece into a position that blocks solar disc light from entering a lens of the at least one camera.

The lighting system can be configured to cause the one or more light emitters to illuminate the target volume with light in accordance with the timing specified by the radar data from the radar system. The one or more light emitters can include light emitting diodes, and the lighting system can include at least one reflector configured and arranged to at least partially collimate light emitted by the light emitting diodes.

The ballistic detection system can include gas dischargers arranged proximate to respective ones of the first and second cameras, wherein the gas dischargers are configured to eject a blast of gas onto respective transparent lens covers for the first and second cameras in accordance with the timing specified by the radar data from the radar system to clear the transparent lens covers of water, dust or other debris, and each of the gas dischargers can include a high speed valve coupled between a nozzle and a gas source. The gas source can include a carbon dioxide cartridge or reservoir containing liquid carbon dioxide.

The details of one or more implementations of the technologies described herein are set forth in the accompanying drawings and the description below. Other features, aspects, and advantages of the disclosed technologies will become apparent from the description, the drawings, and the claims.

BRIEF DESCRIPTION OF DRAWINGS

FIGS. 2B & 2C show examples of processes performed by one or more computers of a ballistic detection system to determine points in three-dimensional space corresponding to image artifacts of a projectile and to define a trajectory of the projectile using the points in three-dimensional space.

FIGS. 3A-3H show examples of flash illumination systems that can be integrated into electromagnetic radiation detection equipment.

Reference numbers and designations in the various drawings indicate exemplary aspects, and/or implementations of particular features of the present disclosure.

DETAILED DESCRIPTION

The systems and techniques described in this application can provide a high probability of detection (e.g., 98% or 99% or higher detection rates) along with high precision location of projectile intersection with the detection area (e.g., within 5, 3, or 1 mm accuracy) and low false positives. Real-time detection of ballistic penetration is provided and allows immediate feedback into the training scenario, including automated reactions based on valid hits. The target sizes can range from less than one meter to over 10 meters in size. The targets need not be stationary during the training exercise. In some cases, the "target" can be an opening such as a window. The incoming direction of munitions can vary during training scenarios. Moreover, a modular design can be provided such that detection fields may be readily assembled that not only vary in size, but can be made to surround a three-dimensional (3D) target volume. The projectiles to be detected range from 5.56 mm caliber (diameter) to much larger caliber weapons. The velocities involved can include subsonic, transonic, and supersonic.

Figure 1A:
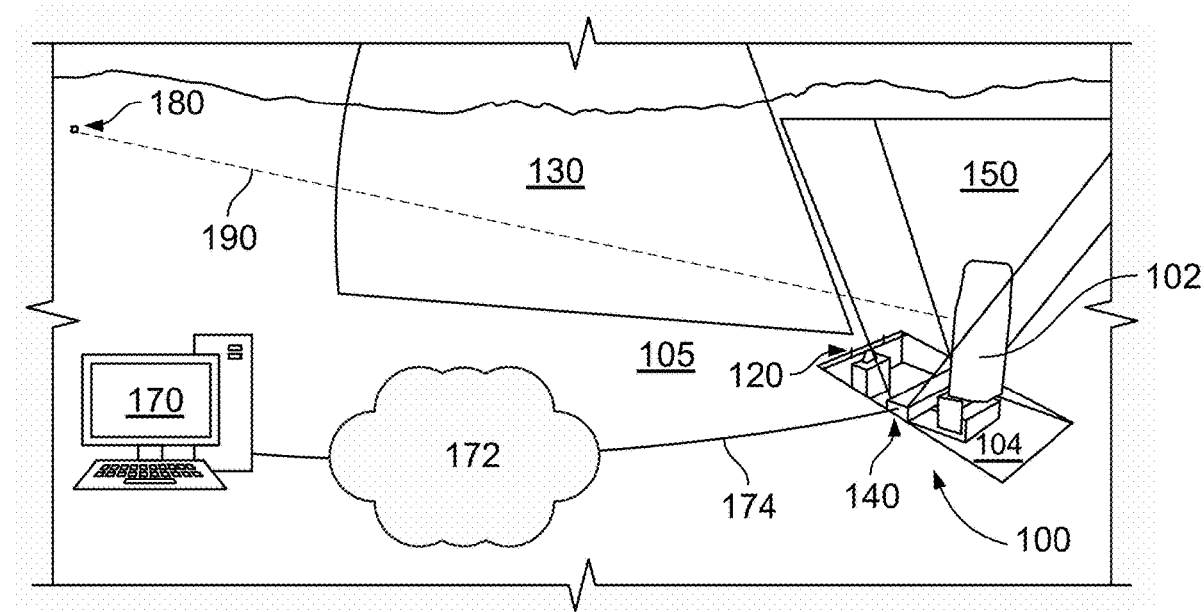
FIGS. 1A-1F show examples of ballistic detection systems used to detect projectiles directed to a target.

FIG. 1A is a perspective view of an example of an implementation of a ballistic detection system 100 that uses radar and cameras to detect a projectile. In this example, a pop-up target 102 is located in a ground trench 104 placed in the ground 105, and a projectile is shot from a location 180 along a trajectory 190 toward the target 102. Other configurations and arrangements of the ballistic detection system 100 are also possible, as described in further detail below. For example, in some implementations, the target 102 is a virtual target.

The ballistic detection system 100 includes a radar system 120 and electromagnetic radiation detection equipment 140 positioned on only a single side of a target volume (e.g., optical field 150) associated with the target 102; in this example the target volume is in front of and partially contains the target 102, as shown in FIG. 1A. The ballistic detection system 100 includes a ballistics analysis computer 170 communicatively coupled with the electromagnetic radiation detection equipment 140 (and potentially also the radar system 120) through a communication link 174. The communication link 174 can be a direct, wire link, and/or be implemented through a network 172. The ballistic detection system 100 can be configured to be compatible with conventional communication networks, e.g., network 172, including wireless, cabled, or fiber optic and including networks specifically used at shooting ranges, such as the U.S. Army's Future Army System of Integrated Targets (FASIT).

Figure 1B:
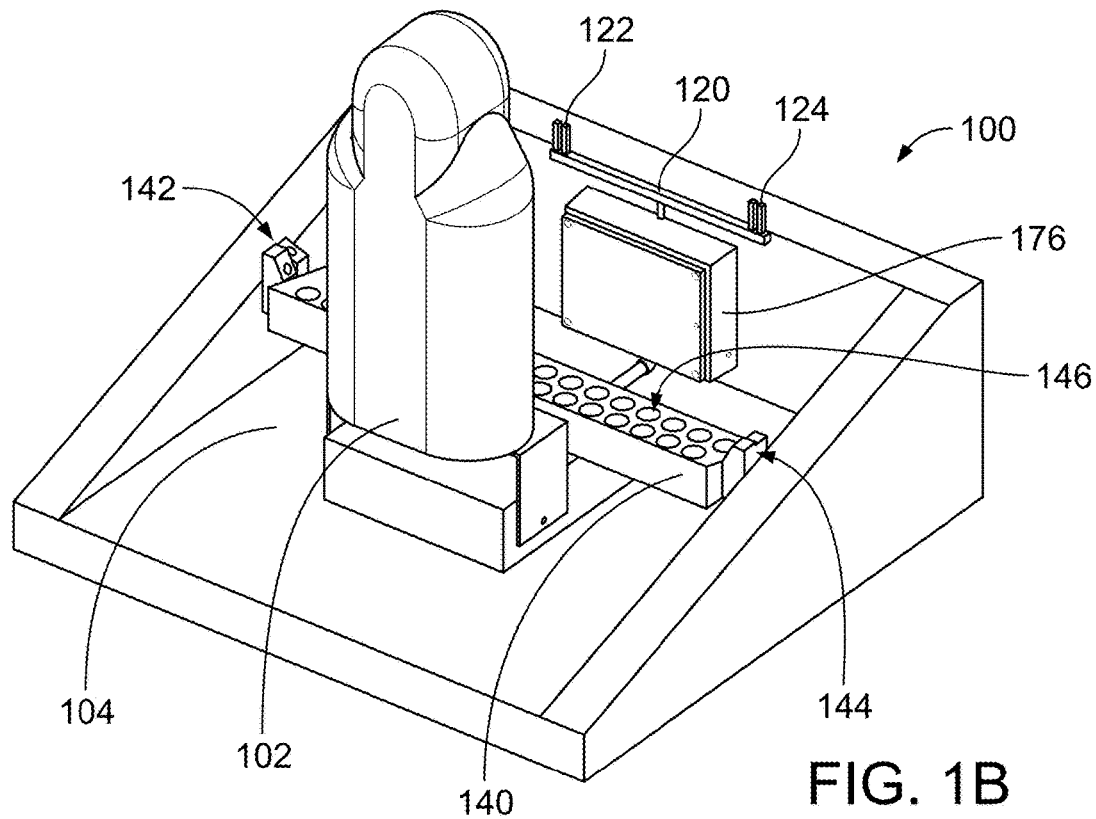

In some implementations, the ballistics analysis computer 170 or a portion of a ballistics analysis computer system 170 is included within the trench 104. For example, the ballistics analysis computer system 170 can include one or more computers/controllers inside an enclosure 176 in the trench 104 (as shown in FIG. 1B) and/or in an enclosure shared with a flash illumination system, as described further below, e.g., in a shared housing with the electromagnetic radiation detection equipment 140. Also, as described in detail below, the ballistics analysis computer 170 is programmed to define the trajectory 190 of the projectile within the target volume, e.g., in front of the target 102, using images from cameras included in the electromagnetic radiation detection equipment 140. Note that the trajectory 190 within the target volume is defined as a velocity composed of a single direction and a single speed.

In other words, the projectile is presumed to have a constant speed along a linear path in three-dimensional space within the target volume of detection. While the presumption of a linear path is not fully accurate, it is essentially accurate given the transit time of the projectile in relation to the gravitational acceleration of the Earth. The assumption of constant speed is essentially accurate for munitions with high ballistic coefficients or low aerodynamic drag when forward (or backward) projecting the trajectory to intersect any arbitrary target surface and determine a point-of-impact. If further precision is needed to accurately identify a point of impact, which may be distant from the target volume of detection, or to identify the location 180, the defined linear trajectory can be converted into a curved, velocity varying trajectory using physics-based ballistic simulation (e.g., using the known gravitational pull of the Earth, a known or determined mass of the projectile, a measured wind speed and direction, and a known or determined size and shape of the projectile). Moreover, an approximate ballistic trajectory calculation can be made to provide an approximate forward or reverse trajectory estimation.

FIG. 1B is a perspective view of a detailed example of an implementation corresponding to FIG. 1A. In some implementations, the ballistics analysis computer 170 is included inside the enclosure 176 in the trench 104 and performs the ballistics processing locally before sending the analysis results over the network 172 (e.g., wirelessly) to another location, such as to a computer with a display device (e.g., a smartphone) at the shooting location 180. Note that the displaying computer can thus also be understood as being part of a ballistics analysis and communication computer system. Further, in some implementations, the ballistics analysis computer 170 is remote from the trench 104, and the enclosure 176 contains one or more controllers to operate the radar system 120 and the electromagnetic radiation detection equipment 140. For example, the enclosure 176 can include power supplies and conditioning electronics, radar circuitry, an imaging controller (e.g., for a flash bar 146 and/or cameras 142, 144), a solar block controller, a lens clearing controller, and a single board computer to control operations of the various equipment and to send imaging data and potentially radar data (e.g., wirelessly) to a computer 170 for processing.

In some implementations, the ballistics analysis computer 170 includes a projectile detector analysis computer 170 that processes the radar signal to determine timing for the projectile, plus a trajectory analysis computer 170 to process the camera images. In some implementations, a single computer 170 performs both the radar signal processing and the camera image processing. Note "timing" for the projectile indicates that the radar is used to determine when the projectile should be above the electromagnetic radiation detection equipment 140; the radar need not be used to measure position or range of the projectile. In any case, regardless of the configuration and distribution of computer(s) and controller(s) in the system 100, the ballistic detection system 100 can be a standalone system in the sense that no external triggers are needed to detect incoming projectiles.

In some implementations, the radar system 120 is a 24 GHz, 35 GHz or 70-77 GHz radar. The radar system 120 can use a Continuous Wave (CW) Doppler radar device, a Frequency Modulated Continuous Wave (FMCW) radar device, Pulsed Doppler radar device, or another type of radar device. In addition, some implementations can include monostatic (transmitter and receiver are co-located), bistatic radar (transmitter and receiver that are separated), and multi-static (multiple distributed transmitters and/or receivers). The radar can provide radial speed measurements of a munition towards or away from a co-located transmitter and receiver pair. The radar can provide a net speed measurement that is the net sum of radial speeds toward or away from bistatic pairs. In some implementations, the radar system includes first and second radar antennas 122, 124 that are spaced apart from each other, e.g., Doppler radar using separate transmit/receive antennas. In some implementations, only a single radar antenna is used, provided it can be used to both transmit and receive radar signals.

In some implementations, multiple transmit and multiple receive antennas that are distributed in a known pattern can be used. Each transmit-receive pair can measure an independent net radial speed of the munition relative the transmit-receive pair. A transmit-receive pair can provide constrained trajectory information (only a subset of all trajectories are possible given the measured speed vs. time data). Additional pairs of transmit/receive radars (operating on different transmit frequencies) can provide redundancy in case one antenna is disabled by being struck by a bullet, and provide additional geometric information (constraints) about the approximate trajectory. Moreover, trajectory information from radar can accelerate analysis of image data by limiting the range of data explored when looking for the trajectory. Using munition radial speed measurements and the spatial trajectory calculated by the imaging system, the munition's true speed can be calculated.

In some implementations, more than two radar antennas are used, such as the four radar antennas shown in FIG. 1B. Note that even though most of the components of the ballistic detection system 100 are within the trench 104 (or behind appropriate shielding) and so are protected from the incoming projectiles, the radar antenna(s) may need to remain in the line of fire to detect the incoming projectiles. Thus, since the radar antennas can be hit by the projectiles, it is useful to include additional radar antennas so the system 100 can continue to operate (without needing immediate repair) even after one or more radar antennas 122, 124 have been shot. Moreover, in some implementations, the antennas 122, 124 are printed circuit boards (e.g., about 15 mm wide and 30 cm long) protected by a thin cylinder made of low dielectric material, such as plastic, to reduce interference in transmission through them.

Figure 1C:
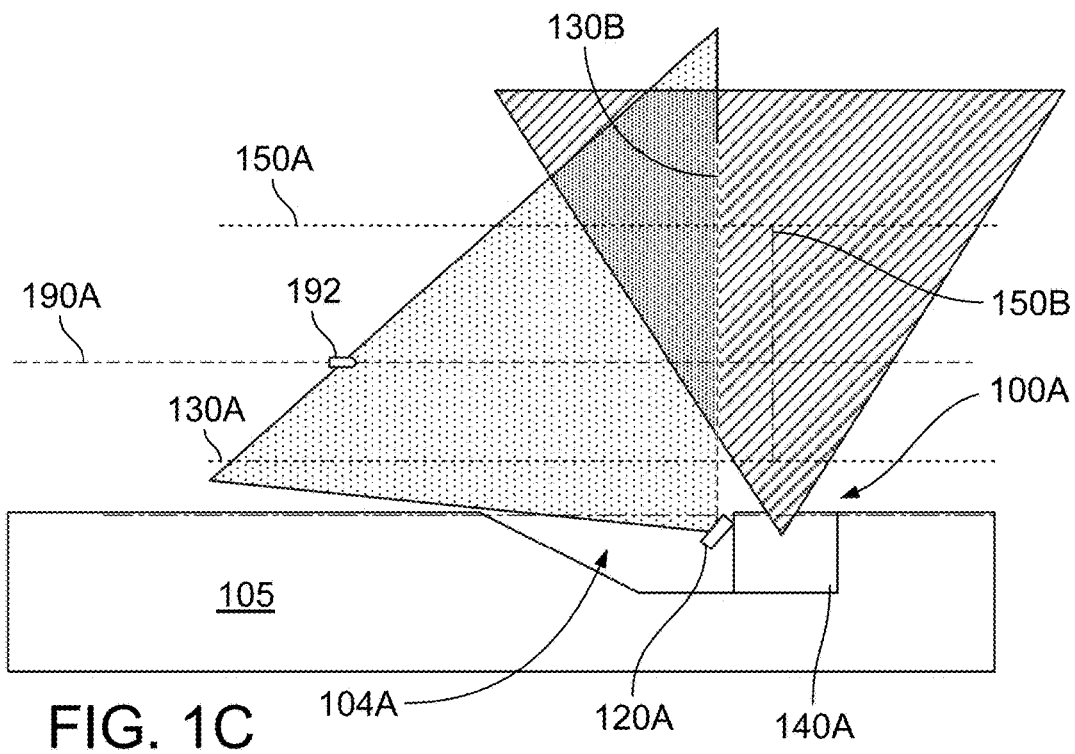
Figure 1D:
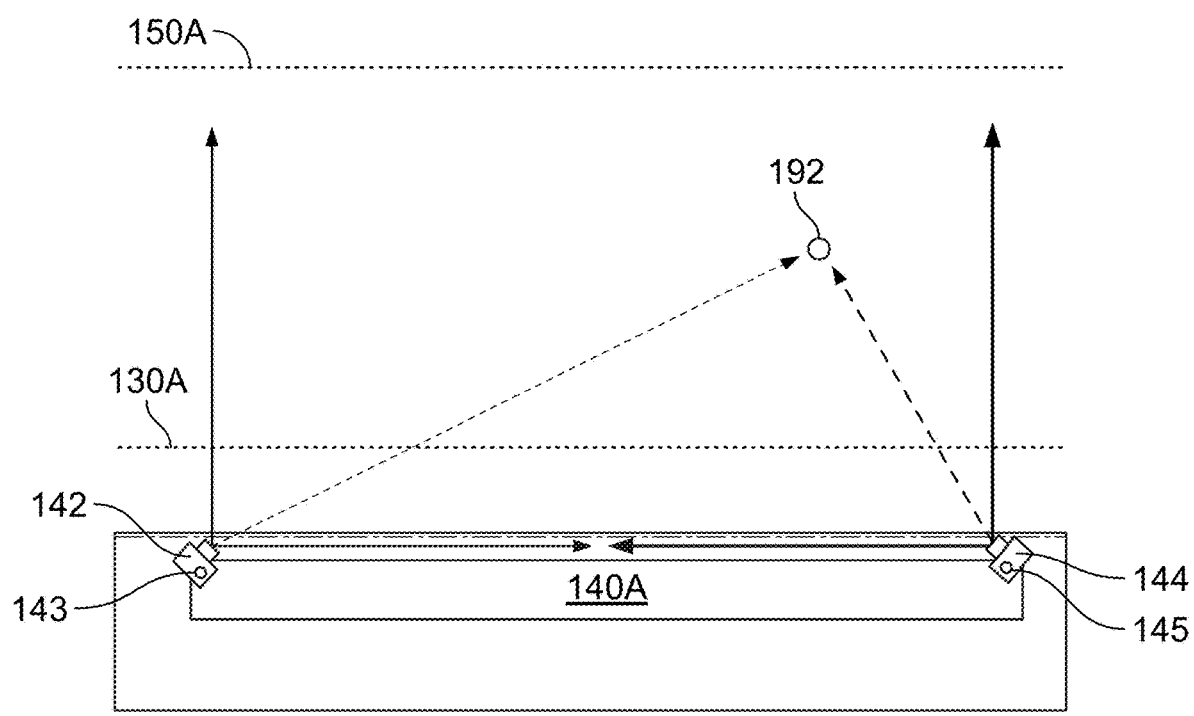

However, in some implementations, the radar antennas are also kept out of the line of fire even when used to detect incoming projectiles. FIG. 1C is a side cross-sectional view of an example of an implementation of a ballistic detection system 100A that uses radar and cameras to detect a projectile, and FIG. 1D is a front cross-sectional view (the projectile travelling essentially perpendicular to the page) of the ballistic detection system 100A of FIG. 1C. As shown, a trench 104A in ground 105 includes a cutout portion in front of a CW Doppler Radar 120A (in the direction of an incoming bullet 192 on a trajectory 190A). Placing the radar 120A under ground level creates a lower detection limit 130A (e.g., 0.5 meters above ground level) in addition to the upper detection limit 150A (e.g., 2.5 meters above ground level) created by the resolution of the cameras 142, 144 in electromagnetic radiation detection equipment 140A.

Even so, the leading cutaway portion of the trench 104A allows the CW Doppler Radar 120A to detect the incoming bullet 192 in sufficient time to trigger operation of the electromagnetic radiation detection equipment 140A, e.g., by determining when the bullet 192 is expected to reach a radar trigger plane 130B corresponding to zero radial velocity (when the speed of the bullet 192 relative to the radar 120A is zero) and then accounting for the distance between the radar trigger plane 130B and a center plane 150B of the detection zone of the electromagnetic radiation detection equipment 140A.

Thus, none of the components of the ballistic detection system 100A are placed in the line of fire, including the antenna(s) of the radar 120A. Other arrangements of the system components are also possible so as to keep all (or all but the radar antennas) out of the line of fire. In some implementations, none of the components of the ballistic detection system are placed underground, e.g., in trench 104 or trench 104A, but rather have appropriate shielding placed between the components and the incoming projectiles. Further, in some implementations, the radar detection points downrange instead of uprange.

Returning to FIGS. 1A and 1B, the radar system 120 detects incoming projectiles as they enter a radar field 130. In some implementations, the radar system 120 detects incoming projectiles moving at high speeds when they are within 3 to 5 meters of the target volume of detection. The radar system 120 can generate a speed value every 400 microseconds, which is sufficiently fast to provide real-time projectile detection; the radar system 120 can provide a trigger to the cameras with sub-millisecond latency for incoming rounds in the detection area. At this radar "frame" rate, a typical projectile will move about 30 to 40 centimeters between speed readings, allowing the radar system 120 to build a model of the trajectory with increasing precision, and then trigger operation of the electromagnetic radiation detection equipment 140 based on the timing determined for the projectile using the radar system 120.

For example, the radar system 120 can obtain the radial component of the projectile's velocity (e.g., the radial speed at which bullet is approaching radar) and building the model of the trajectory can include fitting a curve to the data to predict a zero point, where the speed of the projectile in the direction of the radar antenna(s) (the radial velocity) is expected to be zero. This zero point can then be used to trigger the cameras based on the known distance between the radar antenna(s) and the cameras. Further, in some implementations, the radar measurements are performed with at least two antennas with known positions, a phase difference between the antennas is obtained in addition to a radial speed for each antenna, and this phase difference provides additional location information for the bullet. Note that the radar is capable of locating the bullet but with reduced accuracy; radar signals are limited by their long wavelengths and are subject to multi-path issues—they bounce off ground and other objects and this creates errors, thus requiring more sophisticated algorithms to attain high accuracy of determination of the location of the projectile using radar based means.

In some implementations, data from four analog to digital converters (ADCs) coupled with two radar antennas (antenna 1 I & Q (I=in-phase and Q=quadrature (90 deg. phase shift)) and antenna 2 I & Q samples) is acquired in parallel using four different DMA (Direct Memory Access) channels, and the raw data frame acquisition and the FFT (Fast Fourier Transform) processing of the frame data is overlapped—while a raw data frame is being acquired the previously acquired raw data frame is going through FFT processing. For example, ping-pong buffers can be used, where one buffer is being filled up by a DMA transfer while the other buffer is being processed at the same time. As another example, a ring array of raw data buffers can be used, where the DMA controller cycles through these buffers. In addition, radar sensitivity to incoming rounds can be improved if the trigger algorithm is based on correlations between channels from respective receive antennas.

An advantage of using the radar system 120 to trigger the cameras is that there is no need to continuously acquire images at a high rate, roughly 500 images per second or more, where all those images would then need to be processed. Doing image analysis on all these images could lead to a backlog and thus a failure to deliver real-time results. The radar solves this problem by cueing the system when to expect a passing bullet and allowing the system to perform image analysis on relatively few images. In some implementations, the timing for the projectile (as determined by the radar system 120) is used to trigger a flash of light (e.g., infrared light) by flash bar 146 and also image capture by two or more cameras 142, 144 in the electromagnetic radiation detection equipment 140. Using such a flash to illuminate the projectile makes it brighter than the background brightness (i.e., contrast is improved) which makes it easier to find the projectile image artifact in the image. Further, once the cameras are triggered, multiple images can be taken, e.g., an image every 2 milliseconds (2 meters or less travel for a typical bullet) with gaps of about 0.2 milliseconds or 20 cm of travel.

As another example, in some implementations, the two or more cameras 142, 144 continuously capture images that are stored in one or more memory buffers (e.g., a circular buffer 143, 145 for each camera 142, 144 that holds between five and thirty of the most recently captured images) and the timing for the projectile (as determined by the radar system 120) is used to trigger retrieval of images from the one or more memory buffers (potentially after first stopping image capture to avoid overwriting the buffered images). Note that, in implementations where the cameras 142, 144 continuously capture and store images in a memory buffer, and the target is a virtual target that will not stop the projectiles, the radar system can point the other direction (downrange rather than uprange) and thus detect the projectile as (and/or just after) it passes through the target volume; this allows the radar antenna(s) to be removed from the line of fire.

In any case, at least one first camera 142 is arranged with respect to the target volume (e.g., optical field 150) to view the target volume from a first perspective defined by a first position and a first orientation of the first camera 142, and at least one second camera 144 is arranged with respect to the target volume (e.g., optical field 150) to view the target volume from a second perspective, the second perspective defined by a second position and a second orientation of the second camera 144. Thus, the cameras 142, 144 have fields of view that provide different look angles into the target volume of detection for use in determining the location and direction of the projectile. In some implementations, the cameras 142, 144 are global shutter cameras, in which the whole image is exposed at the same time (the entire image sensor is exposed at once in the same time interval). This provides the advantage of avoiding distortions created by rolling shutter cameras. In some implementations, the cameras 142, 144 are rolling shutter cameras, in which lines of the image are exposed progressively. These types of camera shutters induce distortions in high speed images, but the cameras 142, 144 can be oriented to minimize the induced distortions.

The ballistics analysis computer 170 obtains the image data captured by the first and second cameras 142, 144 in accordance with the timing specified by the radar data from the radar system 120, and the ballistics analysis computer 170 can determine at least two points in three-dimensional space using intrinsic and extrinsic parameters of the first and second cameras 142, 144. The at least two points in three-dimensional space correspond to image artifacts of a projectile detected in the image data, such as described in further detail below.

The intrinsic parameters of the first camera 142 characterize transformation between image plane coordinates and pixel coordinates for the first camera 142, the intrinsic parameters of the second camera 144 characterize transformation between image plane coordinates and pixel coordinates for the second camera 144, and the extrinsic parameters of the first and second cameras 142, 144 relate the first perspective and the second perspective to each other. Thus, knowing the locations of, and imaging characteristics for, the cameras 142, 144 along with their orientations with respect to each other, allows at least two points (and in some cases many more) in three-dimensional space to be determined for the projectile on the trajectory 190. With the at least two points in three-dimensional space having been determined, the trajectory 190 of the projectile can be defined within the target volume (e.g., optical field 150), and a point of intersection of the trajectory 190 of the projectile with an object associated with the target volume (e.g., the pop-up target 102) can be found, i.e., a point of impact.

Note that the resolution of the cameras 142, 144 will limit the distance from the camera at which the projectile can be detected. Thus, the optical field 150 has an inherent height limit that is determined by camera resolution. In addition, because each camera 142, 144 is positioned on a respective side of the optical field 150, the width of the optical field 150 is also limited by the camera resolution. In some implementations, the electromagnetic radiation detection equipment 140 is about 1.4 meters long, and the target volume of the optical field 150 has a truncated and inverted rectangular prism shape (as shown in FIG. 1A) that is 1.4 meters wide and 1.4 to 2 meters high.

The dimensions of the optical field (and thus the detection volume) can be modified by adding additional cameras. For example, an additional camera can be included on each side of the equipment 140 to increase the effectively observable volume of the optical field 150 and/or to limit the field of view required for each camera, e.g., restricting each camera field of view to 34 degrees or less; note that restricting the field of view for each camera provides the benefit of less shifting of a filter center frequency in bandpass filter implementations (discussed in detail below) due to the exclusion of data for smaller angles of light incidence (e.g., 73 degrees or less) from needing to be processed, thus minimizing any filter/light source frequency mismatch. As another example of using more than two cameras, the equipment 140 can be built as an imaging module 140, and two or more imaging modules 140 can be connected with one or more controllers (e.g., in a single enclosure 176) and be triggered using one or more radar systems 120, to form a larger target volume.

Figure 1E:
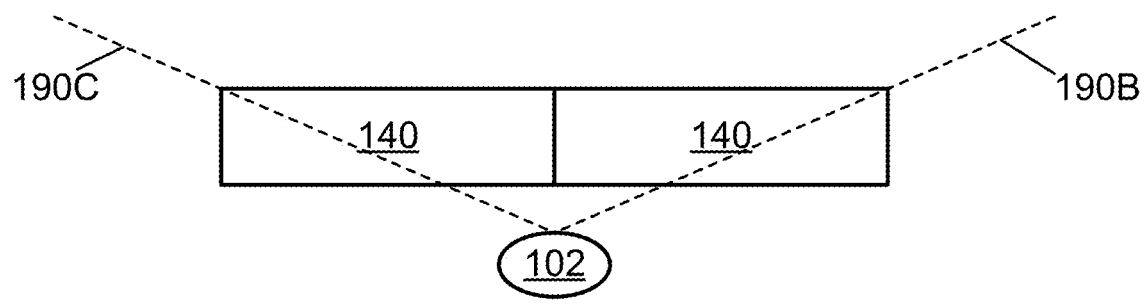
Figure 1F:
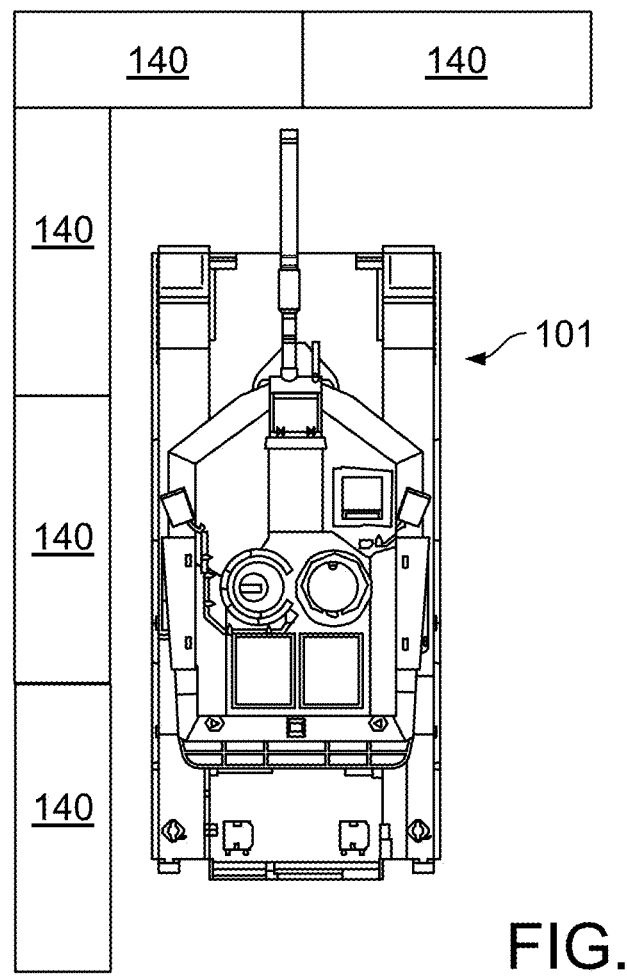

FIG. 1E shows an example of a system in which two imaging modules 140 are placed side by side in front of the pop-up target 102 to create a wider target volume that can handle incoming projectile trajectories 190B, 190C that span a wider angle. Note also that the target 102 need not be fixed in position. The target 102 can be designed to move side to side (left and right in FIG. 1E) on a carriage, in which case, the system 100 can be mounted on the moving carriage holding the target 102, allowing the system 100 to determine the hit/miss or shot score irrespective of the carriage position. FIG. 1F shows another example of a system in which five imaging modules 140 are placed on two sides of a tank target 101, thus creating a target volume covering both the front and one side of the tank target 101. Other camera arrangements are possible, even without using distinct imaging modules 140. In general, the need for additional cameras is based on the size of the target object, the range of incoming trajectories to be detected, the camera resolution, any needed limitation on the allowed angles of light incidence onto any bandpass filters, and the total required detection volume.

Figure 2A:
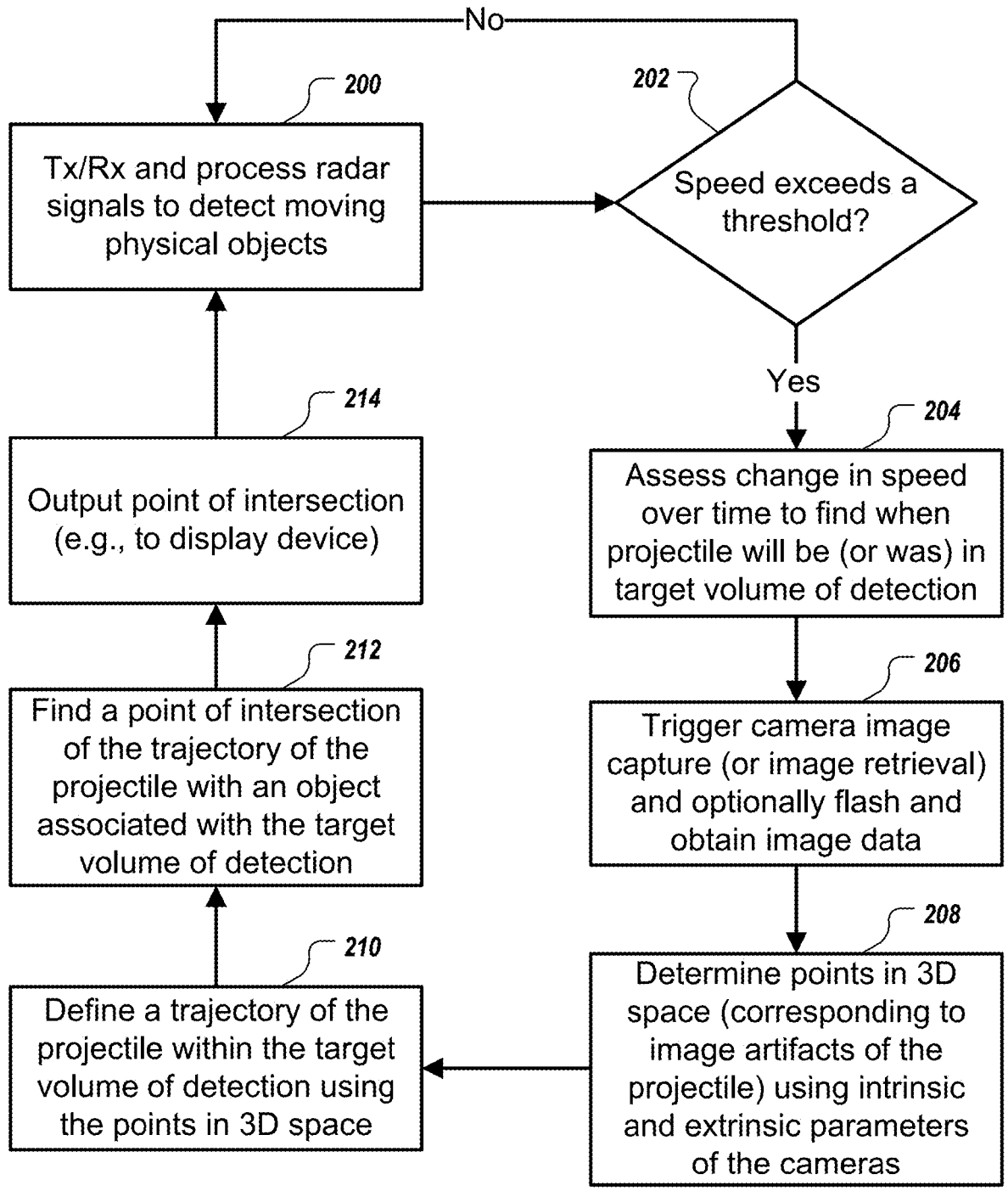
FIG. 2A shows an example of a process performed by one or more computers of a ballistic detection system to determine a point of intersection of a projectile's trajectory with an object.

FIG. 2A shows an example of a process performed by one or more computers of a ballistic detection system to determine a point of intersection of a projectile's trajectory with an object. Radar signals are transmitted (Tx), received (Rx) and processed 200 by one or more computers of a ballistic detection system, such as a Cortex-M4 processor (available from ARM Limited of Cambridge, UK) in a radio frequency (RF) radar device inside an enclosure 176 in ballistic detection system 100 or 100A, to detect a moving physical object. In some implementations, the processing 200 of the radar signal reflected from a physical object provides speed data for the physical object, but no distance data. For example, in the case of a CW Doppler radar device, the radar determines the radial component of the projectile's velocity (e.g., the radial speed at which bullet is approaching radar). In some implementations, the processing 200 of the radar signal reflected from a physical object provides distance and speed data for the physical object. Other data can also be obtained during the radar signal processing 200. For example, the radar signal processing 200 can also determine an initial estimate of the trajectory, which in turn can be used to limit the regions of the images that need to be processed to find the image artifacts representing the projectile. The radar's ability to locate the munition provides means to utilize the flash more accurately, and to cue the feature extraction algorithm responsible for finding the trajectories in the image data. This cue may substantially speed up the algorithm.

In any case, if the speed of the physical object detected by the radar device exceeds 202 a threshold, e.g., 100 meters per second (mps), 200 mps, or more, such as 500 or 1000 mps, the detected physical object is presumed to be a projectile of interest, e.g., a bullet. This speed cutoff indicates that a bullet or other relevant projectile has been detected. Note that one or more other criteria can also be used to detect a bullet or other projectile of interest in the radar data. When this threshold 202 is exceeded, the system assesses 204 a change in the speed of the projectile over time to find when the projectile will be (or was) in a target volume of detection associated with the ballistic detection system.

Based on the timing determined by the assessing 204 of the radar data, image capture by the cameras (e.g., cameras 142, 144) is triggered and image data is obtained 206. In addition, in some implementations, the determined 204 timing is also used to trigger 206 a flash to provide better contrast between the projectile and the background, e.g., triggering 206 of flash bar 146.

In some implementations, the determined 204 timing triggers 206 image retrieval of previously captured images. For example, each of cameras 142, 144 can have a circular buffer 143, 145 that holds captured images over a given period of time. Each circular buffer 143, 145 is a memory buffer able to store N images arranged so that each new image is placed into the buffer by replacing the oldest image, thereby resulting in a buffer of images that always contains the last N images. Thus, each new image captured by a camera overwrites the oldest image in that camera's circular buffer, and an analysis computer for the radar data can be programmed to stop image capturing by the cameras 142, 144 temporarily (the cameras acquire images continuously until triggered to stop) and obtain the image data from the circular buffers 143, 145 that corresponds to the timing (determined from the radar data) when the projectile was expected to be in the fields of view of the cameras 142, 144. In addition, if the circular buffers are large enough and the processing 200-204 is fast enough, then the image capturing by cameras 142, 144 can continue, and the appropriate image data is pulled from the circular buffers 143, 145 before it is overwritten.

Points in 3D space that correspond to image artifacts of the projectile in the captured image data are then determined 208, e.g., by ballistics analysis computer 170, using the intrinsic and extrinsic parameters of the cameras. Note that the intrinsic parameters of a given camera characterize the transformation from image plane coordinates to pixel coordinates in that camera (supporting photometric conversion plus potential homography correction to eliminate perspective distortion). The intrinsic parameters can include imaging characteristics of the camera generally, where the camera is understood to include one or more lenses, and the imaging characteristics include lens focal length, lens-array distance, size of the pixel array, pixel pitch (distance between pixels in the array), and potentially other factors that address camera lens aberrations. Such details of intrinsic camera parameters are well understood in the field of camera imaging or stereo vision. Additional corrections, calibrations and artifact controls can also be performed, as will be understood by those of ordinary skill in the art, such as correcting and/or calibrating for various lens aberrations (including the 5 Seidel aberrations—spherical, coma, astigmatism, distortion, curvature) and changes in intrinsic parameters and/or focus or focus length caused by thermal expansion.

In addition, the extrinsic parameters describe the relative position and orientation of the cameras with respect to each other. Note that to get data from the cameras into a shared 3D coordinate system for 3D space that matches up with the real world involves the use of the extrinsic parameters for the two cameras along with information about the position and orientation of at least one of these cameras in the real world. The details of how to register depth data generated using stereo vision into a real world 3D space are well understood in the field of augmented reality. In any case, once the points in 3D space are determined 208, a trajectory of the projectile is defined 210 within the target volume of detection using those determined points in 3D space.

FIG. 2B shows an example of a process performed by one or more computers of a ballistic detection system to determine 208 points in three-dimensional space corresponding to image artifacts of a projectile and to define 210 a trajectory of the projectile using the points in three-dimensional space. Image artifacts of the projectile in the image data are identified 240 including at least two image locations in each of a first set of one or more images from the first camera(s) and a second set of one or more images from the second camera(s), where each of the at least two image locations correspond to a different time. For example, a first of two successive images from the same camera can be subtracted from a second of these two images, e.g., taken milliseconds apart, and everything that is identical within the two images subtracts to essentially zero, and so only the artifacts of the projectile remain.

In implementations where the shutter speed of each camera 142, 144 is not fast enough to capture more than a single image of the passing projectile (e.g., a frame rate of between 500 and 1000 frames per second (fps); the exposure time can be between 1 and 2 milliseconds in duration) only a single image of the projectile is captured by each camera, the image artifact of the projectile in each image (from each respective camera) is a streak across the image, and the two image locations that correspond to different times are the beginning and the end of the streak in each image, where either or both of the beginning and the end of the streak can be located within the boundaries of the image, or either or both can be at the boundaries of the image (e.g., the bullet artifacts can extend across the entirety of an image when the bullet passes through the full field of view of the camera during the exposure time). Thus, the at least two image locations are a beginning location and an ending location of a streak of image artifacts in each of a single first image from the first camera (or of a composite image from two first cameras) and a single second image from the second camera (or of a composite image from two second cameras). Note that such streak implementations operate well (robustly) against spatially varying contrast of a projectile, which can be especially acute for bullets which are more specular (mirror like); the streak varies in intensity along its length due to bullet shape and varying angular relationship between lights/bullet/cameras.

In other implementations, the cameras 142, 144 are high speed cameras (e.g., a frame rate of between 2000 and 10,000 fps; the exposure time can be between 0.1 and 0.5 milliseconds in duration) that each capture two or more images of the passing projectile. In this case, the image artifacts of the projectile are individual impressions of the projectile in respective snapshots taken by the respective cameras, e.g., a picture taken every 2 milliseconds with an exposure time of a tenth of a millisecond, and the two image locations that correspond to different times are two or more selected ones of these individual impressions in two or more images captures by each of the cameras. Thus, the at least two image locations are (i) first locations of image artifacts in respective ones of at least two first images from the first camera(s) and (ii) second locations of image artifacts in respective ones of at least two second images from the second camera(s). Note that an advantage of using higher frame rates and shorter exposure times is better image contrast between the projectile and the background, and there will be little risk of missing the projectile as may be the case with using short exposure times with lower frame rate cameras. Another advantage of this approach is that the lighting need only be "on" during the relatively short exposure, so less energy is needed in some implementations.

In any case, image analysis is performed to identify 240 the at least two image locations. Note that identifying a line in the image effectively includes identifying at least two image locations. In some implementations, this image analysis is performed by an algorithm that allows for custom angle restrictions and intensity data to be used. Custom angle restrictions reduce the computational time needed by preventing the algorithm from searching for lines at angles that are outside the expected munition trajectory range, and intensity data allows for better extraction of information from the image as opposed to converting pixel values to binary using a threshold function. In some implementations, known line detection algorithms are used.

In some implementations, a candidate lines evaluation technique is used, in which the pixel values found in a difference image along each of multiple different candidate lines are summed for each of the candidate lines, and a maximum value of the sums then corresponds to the actual trajectory line. This procedure can provide trajectory determination at a precision better than 1 pixel. Note that the image is discretized at the pixel level, and a candidate trajectory line may not pass directly through the center of pixels. In view of this, the calculations can use interpolated values to calculate the average pixel value or another metric can be used to evaluate the trajectory feature. As will be appreciated, various methods can be used to find a peak in a 2D data set (in this case, the X and Y dimensions of the 2D data set correspond to the starting and ending points of the candidate lines, and the values of the 2D data set are the sums of the image pixel values for the candidate lines) and such methods include those that can find the center of a feature with sub-pixel resolution.

Further, in some cases, a trajectory feature may enter and/or exit the image through a top or bottom edge, and these trajectories can be accounted for by creating virtual pixels below/above the minimum/maximum index values of the captured image. In some cases, additional edges (top, bottom) of the image can be included. Moreover, rather than applying the candidate lines evaluation technique independently to the difference images of the respective cameras, the analysis of the candidate trajectory line can include the intensity information from the at least two (different camera) image sequences, i.e., two or more difference images can be processed together using the candidate lines evaluation technique.

As noted above, an image differencing technique (subtracting one image from another) can be used for each respective camera to perform the image analysis. Each camera can be presumed to have a fixed orientation, and the background is static on the time scale of a munition passing through the field of view of the camera (~milliseconds). A difference image is generated from two sequential images from a camera (e.g., Im1 and Im2) where the images are the same size and witness the same field of view, e.g., $ImDif\_12(i,j)=Im2(i,j)-Im1(i,j)$. For example, the two images can each have a 2 millisecond exposure time, and have a 0.15 millisecond gap between the two images. Since the bullet is present in only one of the two images (in the case of streak detection) the background content of the images is subtracted away and becomes nominally zero intensity, but the bullet streak artifact appears as non-zero components of the difference image. In some instances, the bullet artifact can appear in multiple sequential images. For example, a third image Im3 may contain a portion (trailing the portion contained in Im2) of the trajectory streak. The image sequence streak artifacts can be accumulated into a single image. ImDif_13 can be calculated as the difference image of Im1 and Im3. The accumulated difference image can be calculated as ImDif_12+ImDif_13. In some cases, one can calculate an accumulated difference using ABS(Im3−Im2) where ABS is the absolute value operator. Both techniques can readily be extended to accumulate additional images if needed.

Lens correction can be applied to the resulting difference image. The lens correction transform corrects the image to a true rectilinear image, e.g., an image in which straight lines in the real world appear as straight lines in the image. Note that the specific lens correction routine will depend on the specific lens, as will be understood by those familiar with image processing techniques. Further, while one can apply the lens correction to each of the original images (Im1 and Im2) first, and then perform the image differencing, doing the correction later in the process means the lens correction is done once rather than twice (or more if accumulation of images is used). This is less computationally demanding.

In general, the at least two image locations in the first set of one or more images is transformed 242 into respective two dimensional coordinates in the image plane of the first camera using the intrinsic parameters of the first camera. Note that the intrinsic parameters of the first camera characterize the transformation from image plane coordinates to pixel coordinates in that camera, but the pixel coordinates and the image plane coordinates can be represented in different ways. For example, the two dimensional coordinates in the image plane can be distance values (e.g., X and Y values in the image plane of the camera) or angular values (e.g., azimuth and elevation angles measured with respect to the optical axis of the camera). In addition, if there is more than one first camera with different positions and orientations (to increase the detection volume and/or to limit incidence angles, as described above) the transformation 242 is performed for each respective first camera that captured an image.

This process is repeated for the one or more second cameras. Thus, the at least two image locations in the second set of one or more images is transformed 244 into respective two dimensional coordinates in the image plane of the second camera using the intrinsic parameters of the second camera. As with the first camera, the intrinsic parameters of the second camera characterize the transformation from image plane coordinates to pixel coordinates in that camera, but the pixel coordinates and the image plane coordinates can be represented in different ways (distance or angular values). In addition, if there is more than one second camera with different positions and orientations (to increase the detection volume and/or to limit incidence angles, as described above) the transformation 244 is performed for each respective second camera.

A first point of the at least two points in three-dimensional space is found 246 using a first of the two dimensional coordinates in the image plane of the first camera, a first of the two dimensional coordinates in the image plane of the second camera, and the extrinsic parameters of the first and second cameras in relation to the position and orientation of one or both of the first and second cameras in three-dimensional space. Likewise, a second point of the at least two points in three-dimensional space is found 248 using a second of the two dimensional coordinates in the image plane of the first camera, a second of the two dimensional coordinates in the image plane of the second camera, and the extrinsic parameters of the first and second cameras in relation to the position and orientation of one or both of the first and second cameras in three-dimensional space. These operations 246, 248 involve stereo vision and 3D space registration, as described above.

Thus, two points in 3D space for the projectile are found, where each of the two 3D points corresponds to a different time. Then, a direction of the projectile is defined 250 as coincident with a line connecting the first point with the second point in 3D space. Further, a speed of the projectile can be defined 252 using the image data, the radar data, or using both the image data and radar data. Using the image data to define 252 the speed can involve dividing a distance between the first point and the second point in 3D space by a difference between a time of the first point and a time of the second point; the distance in 3D space is readily calculated from the known 3D coordinates of the two points in 3D space. In the case of image streak implementations, the time difference is known from the shutter speed of the first and second cameras; note that the first and second cameras should have the same shutter speed and be synchronized in time. In the case image snapshots implementations, the time difference is calculated from the known frame rate of the cameras and the known number of images taken (zero or more) between the selected images. In this case, time synchronization of the first and second cameras is not required, but may be done anyway.

But regardless of how the time difference is determined, the defined 250 direction and the defined 252 speed together form the defined 210 trajectory for the projectile. Note that determining the point of impact can be done with just the defined direction, and so speed need not be determined. But providing the speed information is also useful. In addition, in some implementations, the speed of the projectile is defined 252 using the radar data (from uprange, downrange, or both) in addition to (or instead of) using the distance and the time difference. For example, in the case of CW Doppler radar, the radar determines the radial component of velocity (e.g., radial speed at which bullet is approaching radar) but at longer ranges, the Doppler read speed is close to real speed. This information from the radar data can be used to adjust the determined speed for the projectile. Further, regardless of the type of radar device used, additional radar analysis can provide geometric data that can be used to refine the velocity calculation for the projectile.

Moreover, in some implementations, a second set of electromagnetic radiation detection equipment 140 can be placed downrange of the first with a known distance between them, and the trajectory analysis can be performed on two sequential sets of images from the two offset optical detectors 140 to further improve the trajectory (direction and speed) determination. Finally, if the target is of a type that will stop the projectile when hit (e.g., a metal gong) a rear looking radar can be used to either detect or not detect a receding bullet and thereby determine miss or hit respectively, which can be useful for shots that are very close to the target edge where optical system could mistake hit/miss due to a small error.

FIG. 2C shows another example of a process performed by one or more computers of a ballistic detection system to determine 208 points in three-dimensional space corresponding to image artifacts of a projectile and to define 210 a trajectory of the projectile using the points in three-dimensional space. Image artifacts of the projectile are identified 270 in the image data including a stripe in each of a first set of one or more images from the first camera and a second set of one or more images from the second camera. For example, a first of two successive images from the same camera can be subtracted from a second of these two images, e.g., taken milliseconds apart, and everything that is identical within the two images subtracts to essentially zero, and so only the artifacts of the projectile remain.

The "stripe" can be a streak in a single image (or a composite image) or a series of two or more snapshots of the projectile in two more images, as described above. But regardless of whether a slower shutter speed is used (generating a streak as the stripe representing the projectile trajectory in the image data) or a faster shutter speed is used (generating a series of snapshots of the projectile as the stripe representing the projectile trajectory in the image data) synchronization between the cameras (exposure times coinciding exactly) is not required because the images from the respective cameras need not be exactly aligned in time in the implementations corresponding to FIG. 2C; rather, each camera need only catch a portion of the trajectory of the projectile within the target volume of detection. However, in some of these implementations that identify stripes in the images, the cameras are nonetheless synchronized with each other.

In any case, image analysis is performed to identify 270 the stripes in the images. In some implementations, this image analysis is performed by an algorithm that allows for custom angle restrictions and intensity data to be used. Custom angle restrictions reduce the computational time needed by preventing the algorithm from searching for lines at angles that are outside the expected munition trajectory range, and intensity data allows for better extraction of information from the image as opposed to converting pixel values to binary using a threshold function. Further, the image analysis process can employ the image differencing, lens correction, and candidate lines evaluation techniques described above.

The stripe in the first set of one or more images is transformed 272 into a line in the image plane of the first camera using the intrinsic parameters of the first camera. Likewise, the stripe in the second set of one or more images is transformed 274 into a line in the image plane of the second camera using the intrinsic parameters of the second camera. The intrinsic parameters of the first and second cameras are used as described above, but in this case to generate lines in the image planes rather than individual points. However, as will be appreciated, each line in a camera's image plane can be defined using only two points in the image plane, i.e., using respective two dimensional coordinates in the image plane, where these image plane coordinates can be represented in different ways (distance values or angular values).

The line in the image plane of the first camera is converted 276 into a first plane. Likewise, the line in the image plane of the second camera can be converted 278 into a second plane. In some implementations, the conversion 276 is maintained in the coordinate frame of the first camera, and the conversion 278 is maintained in the coordinate frame of the second camera. Thus, one can (using a camera with a given lens configuration) transform each pixel in the image to a specific direction from the camera. This direction can be characterized by two angular quantities, for instance the elevation angle (relative to the principal camera optical axis) and the azimuth (right-left) angle. Two points in an image plane can thus be transformed into two lines emanating from the camera lens, where those two lines define a plane, which of necessity intersects the optical center of the camera lens. The trajectory of the projectile lies within the defined plane for a given camera, even though the defined plane does not uniquely identify the trajectory line within that plane. In addition, in some implementations, the conversions 276, 278 use the respective positions and orientations of the different cameras to produce first and second planes defined in a shared 3D coordinate system for 3D space, i.e., using the 3D space registration described above.

With the first and second planes defined, the first plane and the second plane are intersected 280 to form a line in three-dimensional space. If the first and second planes are already defined in a shared 3D coordinate system for 3D space, then the intersection 280 is done directly. If the first and second planes are defined in the coordinate systems of the respective cameras, then the intersection 280 is done in accordance with the extrinsic parameters of the first and second cameras in relation to the position and orientation of one or both of the first and second cameras in three-dimensional space. Note that this involves using similar techniques as in stereo vision (described above) but without a need to find pairs of matched points in the images from the first and second cameras (i.e., the correspondence problem found in stereo vision applications need not be addressed).

In either case, note that the line in 3D space (produce by intersecting 280 the two planes) includes at least two points in 3D space (in fact, the line can be defined using only two points in 3D space) that correspond to the projectile's trajectory. Thus, a direction of the projectile is defined 282 as coincident with this line in three-dimensional space. Further, a speed of the projectile can be defined 284 using the image data (e.g., if the cameras are synchronized, as described above), the radar data (e.g., using uprange and/or downrange radar data, as described above), or using both the image data and radar data. Note again that determining the point of impact can be done with just the defined direction, and so speed need not be determined, but providing the speed information is also useful. Moreover, as before, additional radar analysis can provide geometric data that can be used to refine the velocity calculation for the projectile.

Returning to FIG. 2A, a point of intersection of the trajectory of the projectile with an object associated with the target volume of detection is found 212. In some implementations, the object is a physical object serving as the target for the shooter, such as the target 102. Note that the physical object serving as the target can be flat (e.g., a bullseye printed on a piece of paper) or non-flat (e.g., a mannequin or other 3D shape approximating a human shape). In either case, using a known location and orientation, plus the 3D geometry of a target surface (in the case of a non-flat target) for the physical target allows the point of intersection to be readily found 212 by identifying the point in 3D space where the trajectory first intersects the surface of the target.

In some implementations, the object is a virtual object serving as the target for the shooter. For example, the virtual object can be a computer generated image presented in augmented reality goggles/glasses worn by the shooter or displayed on a tablet computer or smartphone. Note that this virtual object may or may not correspond to some physical object on the shooting range. As another example, the virtual object can be a computer generated image that is projected onto a screen, e.g., a fog screen, which can be downrange or uprange of the cameras. In some implementations, the screen is not substantially damaged by the rounds fired at it, or the damage is at least not of concern, e.g., an aluminized Mylar sheet attached to a rigid low-cost backing like plywood or high density fiberboard (HDF); the screen can sustain many strikes by bullets, gradually degrading, and eventually would need to be replaced. In any case, the virtual object has a known location and orientation, and optionally 3D geometry of a target surface, as with the physical target, and thus the point of intersection can be readily found 212 by identifying the point in 3D space where the trajectory first intersects the surface of the virtual target.

With the point of intersection having been found, this point of intersection can be output 214, which can include saving information concerning the found point of intersection for the shot to a non-transitory computer readable medium, or rendering information concerning the found point of intersection to a display device, or both. For example, the point of intersection can be presented 214 (graphically or in text) on a smartphone or tablet computer (or other device with a display screen) which can be located by the shooter, e.g., at location 180. The presentation of this information can also include additional information derived from the determined point of intersection, such as whether or not this was a kill shot in view of the location on the target, and such information can also be presented graphically, such as using an animation to indicate this was a kill shot.

Other examples include the point of intersection being displayed 214 in augmented reality goggles/glasses worn by the shooter, or the point of intersection being projected 214 onto a screen, e.g., a fog screen. In both cases, the presentation of this information can also include additional information derived from the determined point of intersection, such as whether or not this was a kill shot in view of the point of impact on the target. For example, the projected images or the images rendered in the augmented reality goggles/glasses can include animation of the virtual target (e.g., a zombie walking toward the shooter) and the animation can be changed based on the point of intersection (e.g., the virtual zombie may need to be hit in the head or the heart before it finally falls down in the augmented reality display).

The ballistic detection systems and techniques described in this document can be implemented indoors or outdoors, and can operate in daylight conditions as well as at night. The cameras 142, 144 can be designed to limit the light capture to ultraviolet, visible, or infrared light. When high speed cameras 142, 144 are used, e.g., over 1000, 2000, 3000, 4000, or 5000 fps, the flash bar 146 need not be used in some applications, e.g., in outdoor environments, since the fast shutter speed can provide sufficient contrast between the projectile and the background. At more than 1000 fps, the exposure time can be made short enough that the background light does not overwhelm the reduction of light from the projectile blocking the incoming light, so the system can achieve good contrast and still find the projectile even in full sun outdoors (e.g., rather than looking for a bright spot representing the bullet when a flash has been used, the system looks for a dark spot representing the bullet in the image).

Moreover, in such implementations, the radar need not be used to trigger the cameras, as the cameras can be allowed to run continuously. However, it may still be advantageous to use a radar device (or another triggering mechanism, such as a triggering device attached to the muzzle of the gun or an acoustic sensor placed close to the shooter) to reduce the amount of image processing that needs to be done by providing the timing that indicates when to look for the projectile in the images. Note that using radar as a projectile detector placed near the target volume is advantageous because it provides high accuracy for determining the timing of the projectile, even when it is coming in at an angle.

Nonetheless, the flash bar 146 can still be included in these various implementations for use in situations where the ambient lighting (natural or artificial) is not adequate to extract the projectile artifacts from the captured images. In implementations that operate at night (or in a darkened indoor environment) the flash bar 146 (or similar flash illumination device) can be used, but without the need for such high power to overwhelm the bright sky, or a low power light source can be left on continuously to illuminate the passing projectiles (e.g., the flash bar 146 can be left on and only flashed as needed, or the flash bar 146 can be implemented as an illumination device 146 without a flash capability). However, in implementations that use slower cameras in outdoor conditions, use of the flash bar 146 (or similar flash illumination device) is typically needed to make the passing projectiles discernible in the captured images. In addition, the wavelength of light used can be such that it is not visible to the shooter, e.g., ultraviolet or infrared light, or be generally less visible in the given environment, e.g., red light in an outdoor daylight environment.

Various options are available for the design of a flash illumination system to implement the flash bar 146, and the flash illumination system can include a reflector configured and arranged to at least partially collimate the emitted light, which can be infrared, ultraviolet or visible light. For example, FIG. 3A shows a cutaway perspective view of a flash illumination system 300 that can be integrated into electromagnetic radiation detection equipment 140, 140A. The system 300 includes a light source 305, which can be implemented using downward directed light emitters 305A, 305B. The light emitters 305A, 305B can include narrowband or monochromatic light emitters, light emitting diodes (LEDs), or both. The light from the source 305 is directed toward a reflector 310, which in this example is a parabolic reflecting dish configured and arranged to reflect and collimate light from LEDs 305A, 305B. This causes the emitted light to be at least partially focused and increase the lighting amount in the target volume that is viewed by the camera 142.

In some implementations, the flash illumination system includes multiple reflectors configured and arranged to at least partially collimate the emitted light. For example, FIG. 3B shows a perspective view of a flash illumination system 320 that can be integrated into electromagnetic radiation detection equipment 140, 140A. The flash illumination system 320 includes multiple individual light sources 325, which can include narrowband or monochromatic light emitters, light emitting diodes (LEDs), or both. FIG. 3C shows an example of a light source 325, which includes a reflector 330 on top of an upward directed light emitter 335. Further, as shown in FIG. 3D, the light emitter 335 can be built using a solderless connector 335A attached to an LED chip 335B. Thus, the LEDs in a flash illumination system 320 can be directed upward through reflectors 330, which partially collimate the emitted light (e.g., beam focusing to less than 15 degrees half width at half maximum (HWFM)) to increase the lighting amount in the target volume that is viewed by the cameras 142, 144.

Figure 3E:
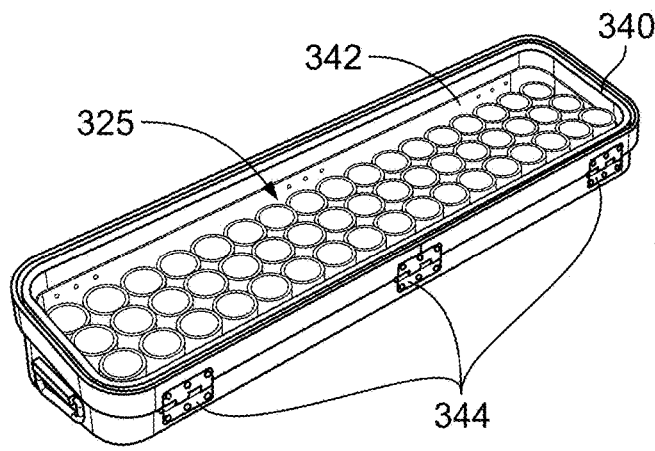
Figure 3H:
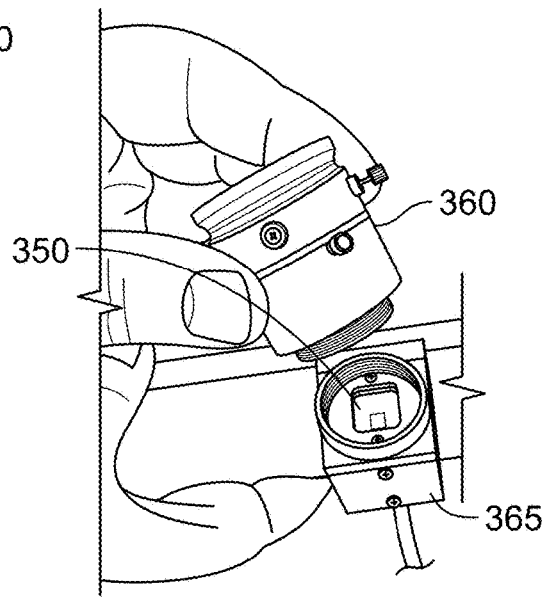
Figure 3F:
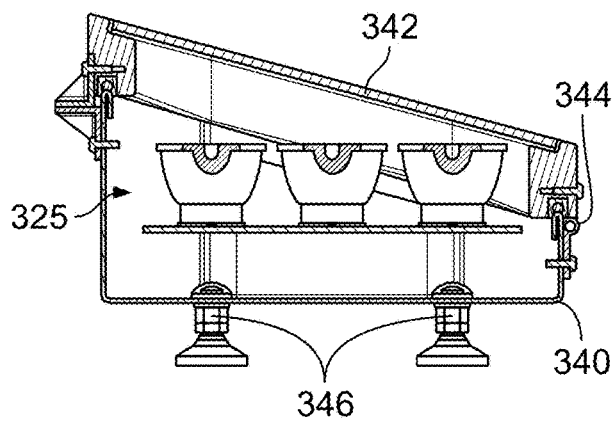

In addition, the flash illumination systems 300, 320 can have an enclosure that protects the equipment from rain and debris. In the example of FIG. 3A, the flash illumination system 300 includes a cover 315 that is optically transparent (made of glass or plastic material) at least at the wavelengths of light that are emitted by the light source 305. Similarly, FIG. 3E shows an example of an enclosure 340 for the individual light sources 325, where the enclosure 340 includes a cover 342 that is optically transparent (made of glass or plastic material) at least at the wavelengths of light that are emitted by the light sources 325, and that is attached using hinges 344 to make the cover easier to open for maintenance. The covers 315, 342 protect the light sources from rain, dust and other debris. The enclosure 340 can be constructed using folded sheet metal. Moreover, the flash illumination systems 300, 320 can include adjustable legs to facilitate positioning during system setup. For example, FIG. 3F is a cross sectional view of the flash illumination system 320 including adjustable legs 346.

Figure 3G:
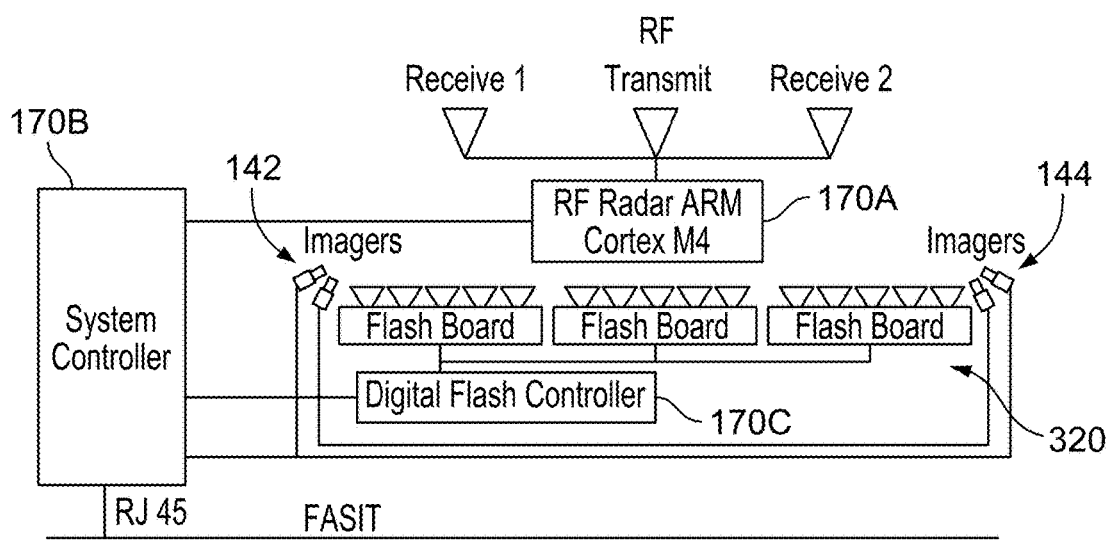

To further illustrate integration of a flash illumination system with electromagnetic radiation detection equipment, FIG. 3G is a schematic diagram showing an example of this integration. The flash illumination system 320 includes three flash boards coupled with a digital flash controller 170C, which is a portion of the computer/controllers 170 described above. In some implementations, the digital flash controller 170C produces control pulses with 10 microseconds timing resolution, and pulse trains with variable duty cycles from 0 to 100%, and current amplitude control. In some implementations, embedded software in the digital flash controller 170C enables on-demand a set of pulses of desired duration (from 1 to 100's of microseconds), with a prescribed on/off duty cycle; this can be followed by a pause before repeating the previous pulsing sequence. Such pulse width modulation can provide efficient brightness control.

Further, the digital flash controller 170C can include or be coupled with one or more capacitors, which hold a substantial electrical charge for use in generating the flash. Note that some environments (e.g., looking up into a bright sky during daylight) require a substantial amount of emitted light to make the projectile discernible in the captures images. For example, in some implementations, the flash of light requires 5000 Watts, which is then discharged to illuminate the target volume for 5 to 10 milliseconds. High rates of fire, e.g., 10 to 15 shots per second with intervals between shots of 60 to 100 milliseconds, where each shot can require 10 milliseconds of flash, can be supported. The light that is emitted will scatter off the projectile but not off the sky; flash illumination falls off with the square of the distance so the flash will not significantly illuminate the background, even when not open sky.

The flash is triggered by the digital flash controller 170C in response to a signal from a system controller 170B, e.g., ARM Cortex M7 processor (available from ARM Limited of Cambridge, UK), which is a portion of the computer/controllers 170 and can include an RJ 45 connection to a FASIT network or other computer network, as described above. The timing for this signaling by the system controller 170B is determined using a radar processor 170A, e.g., an RF Radar ARM Cortex M4 radar processor 170A coupled with three RF antennas: a Transmit antenna, a Receive 1 antenna, and a Receive 2 antenna. The radar processor 170A is likewise a portion of the computer/controllers 170 described above. In some implementations, the system controller 170B takes on most of the computational load including processing the radar data and feature extraction of the images, which need not occur simultaneously. The radar processor 170A acquires and transmits the frame data in real-time to the system controller 170B, which determines when to issue a trigger to the digital flash controller 170C and the imagers 142, 144.

As noted above, the light emitters of the flash illumination system 320 can be narrowband LEDs. In addition, a passband filter can be included between the target volume and the image sensor of each of the imagers 142, 144, where the bandwidth of the passband filter matches that of the LEDs to allow only light having wavelengths associated with the LEDs to hit the image sensor, and all other wavelengths are blocked, which can substantially improve the system's ability to find the artifacts of the projectile in the image data. While a single filter could be used for all the cameras 142, 144, using an individual filter for each camera 142, 144 reduces costs for the system by reducing the amount of filter material used. Each individual passband filter can be placed in front of the camera lens or behind the lens. FIG. 3H shows an implementation in which a narrow passband filter 350 is placed between the lens 360 and the digital focal plane array sensor 365 that forms the image, so as to minimize the needed area of filter material being used in the system.

Figure 4A:
FIGS. 4A & 4B show examples of camera images usable to detect a projectile.
Figure 4B:
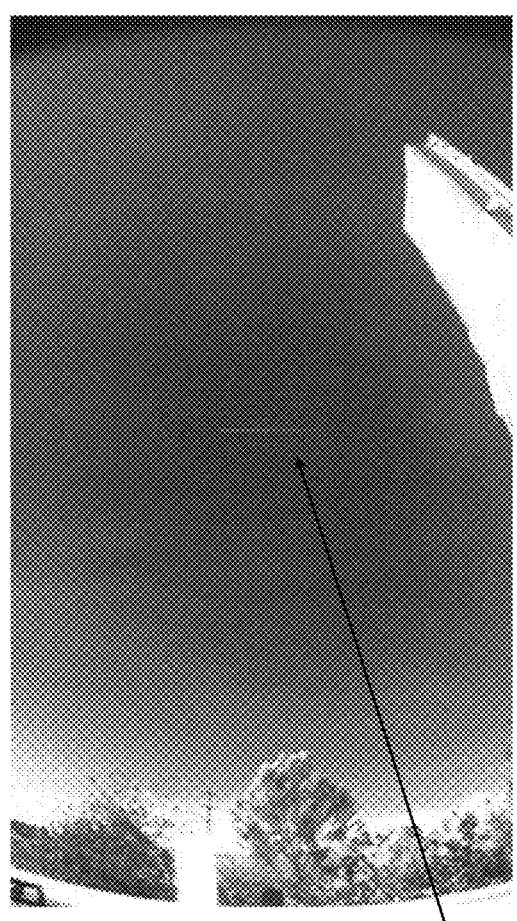

Using narrowband LEDs rather than "white" LEDs, which are broadband across the visible spectrum, can significantly improve the imaging capabilities of the system to support trajectory determination by increasing the contrast of the projectile as compared to the background. For example, single wavelength narrowband LEDs can be used, such as Red LEDs that emit approximately 615 nanometer (nm) light. FIG. 4A shows an example of a camera image 400 taken using red light illumination (615 nm light) and a red passband filter on the camera, where the photograph is taken in broad daylight. As shown, there is no bullet in the image 400. FIG. 4B shows an example of a camera image 405 taken using the same red light illumination and the same red passband filter on the camera, where the photograph is again taken in broad daylight. As shown, a streak 410 in the image 405 clearly identifies the passing projectile; even though the match between the bandwidths of the red light illumination and the red passband filter is not exact in this example, the contrast for the bullet is still good. Further, as discussed above, the speed of the bullet can be determined using the length of the streak 410 and the known duration of the flash and/or the known exposure time used by the camera generating the image 405.

Figure 4C:
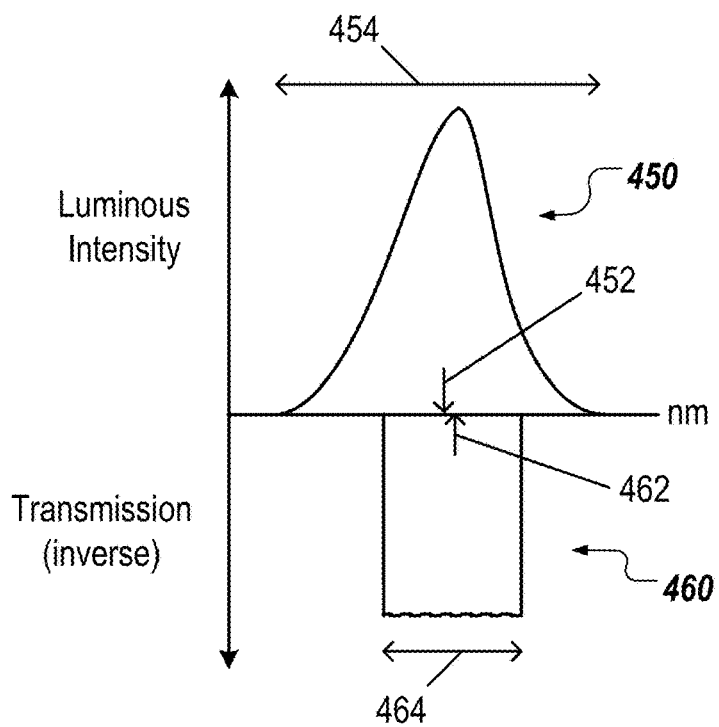
FIG. 4C is a graph showing matching of the bandwidth of a passband filter with the bandwidth of a light source.

FIG. 4C is a graph showing matching of the bandwidth of a passband filter with the bandwidth of a light source. The X axis of the graph represents wavelength in nanometers (nm), the positive Y axis of the graph represents luminous intensity of the light source, and the negative Y axis of the graph represents transmission (inverse scale) of the passband filter. As will be appreciated, each specific type of light source will have a different emission spectrum curve 450 around a central wavelength 452 and a bandwidth 454 straddling the central wavelength 452. Likewise, each specific type of passband filter will have a different transmission spectrum curve 460 around a central wavelength 462 and a bandwidth 464 straddling the central wavelength 462. In some implementations, the bandwidth 464 will be smaller than the bandwidth 454, as shown. This will ensure that the filter spectral window will fall within the LED spectral window, and that the LED source will provide/transmit good light intensity through the filter across a range of temperature/angle of incidence conditions. Further, as noted above, the spectral matching between the light source and the passband filter need not be exact.

In general, the spectral matching involves providing a passband filter that transmits light within narrow wavelength band 464 that includes some or all of the light source's wavelengths of emitted light in the wavelength band 454. The filter blocks wavelengths not within the passband 464. This will increase the contrast between the projectile and the background in the image, thus making it easier to find the projectile in the image. Therefore, illuminating the passing munition is much more effective as the ambient and solar spectrum is largely blocked by the filter, while the artificial light reflecting off the passing munition is allowed through, and the total power needed to sufficiently illuminate the projectile is substantially reduced. In some implementations, the wavelength band 464 is between 25 and 50 nm wide and blocks more than 90% of ambient light, e.g., from the sun. Because the filter is matched to the light source, relatively little of the light source's emitted light is blocked, as shown in FIG. 4C. Thus, selectively blocking ambient light (which is background sky for instance) causes the image artifacts of the projectile (e.g., the illuminated streak) to appear with high contrast.

In general, there is substantial overlap (e.g., more than 50%, 60%, 70%, 80%, or 90%) of the range 464 of frequencies for the filter with the range 454 of frequencies for the light source during operation, and in some implementations, the range of the passband filter's bandwidth 464 is entirely within the range of the light source's bandwidth 454. Also, in some implementations, the central wavelength 462 is selected to ensure that the bandwidth 464 aligns with a portion of the bandwidth 454 in which the light source provides the most illumination, e.g., to match up the range 464 with the HWFM of the light source. However, the placement of the central wavelength 462 in relation to the central wavelength 452 at optimal operating conditions is not the only factor to be considered, given the arrangement of the cameras 142, 144 in the system and the potential need to operate the system under a range of temperature conditions, where this temperature range can be substantial in outdoor environments.

For example, the emission spectrum of typical LED light sources may shift to longer wavelengths (red shift) with rising temperature. Also, the transmission spectrum of typical passband filters may shift to shorter wavelengths (blue shift) with increasing angle of light incidence. For instance, using a lens with a 46 degree field of view (FOV), there will be rays of light coming in at up to approximately 23 degrees off normal incidence. Those rays will be filtered by a blue shifted filter spectrum. Therefore, the LED source that is well matched for normal incidence light, will be attenuated at larger angles resulting in a loss of intensity. To address these issues and improve the system's ability to remove a large fraction of background light (e.g., daylight) wavelengths with the passband filter, thereby reducing the background signal and facilitating detection of the active illumination (of the projectile) by a narrowband light source matched with the passband filter, the bandwidth 454 can be selected to be wider than the bandwidth 464 by an amount that accounts for the shifting of the light emission spectrum of the light source and/or the shifting of the light filtering spectrum of the passband filter.

An LED light source can be chosen to have a bandwidth that is large enough to extend over the region accommodated by the additional red and/or blue shift caused by variations in temperature and/or light incidence angles that are expected for the deployed system. In some implementations, the LED and filter combination are selected such that the LED bandwidth is wider than the filter bandwidth by approximately 15-20 nm. In some implementations, the light source and filter center frequencies 452, 462 and bandwidths 454, 464 are selected such that the wavelengths of light transmitted through the filter will always include at least 90%, 95% or 100% of the wavelengths of light emitted by the light source in its HWFM range, over the planned range of operating temperatures and/or the designed extent of the angles of light incidence to be used for finding the projectile in the image data. Such careful selection of the wavelength ranges in relation to each other will ensure that the filter spectral window will match the LED window and the LED source will provide/transmit sufficient light intensity through the filter under a wide range of temperatures and angles of incidence conditions. Conventional and reasonably priced filters have 10-30 nm bandwidth, and so some implementations will have the LED bandwidth be approximately 40 nm or wider. Note that limiting the bandwidth of the LED light source to be no wider than needed for the expected operating conditions impact on spectrum shifting is beneficial as this will help keep the system efficient with its power usage.

As will be appreciated, various combinations of (i) center wavelength 452 and bandwidth 454 for the light source and (ii) center wavelength 462 and bandwidth 464 for the passband filter are possible, subject to the requirements of the particular application. In some implementations, a far red 730 nm light source with a 38 nm Full Width at Half Maximum (FWHM) bandwidth is used (e.g., a Cree XLamp and Chanzon 100 W module) in combination with a 730 nm filter with 10 nm FWHM (e.g., an Edmond Optics filter). In some implementations, a warm white ~620 nm center frequency LED with ~110 nm FWHM (e.g., Cree or Luxeon CoBs) is used with a MidOpt 635 nm filter with 60 nm FWHM. Other options are also possible, including LED and filter combinations at 850 nm and 940 nm.

Figure 5A:
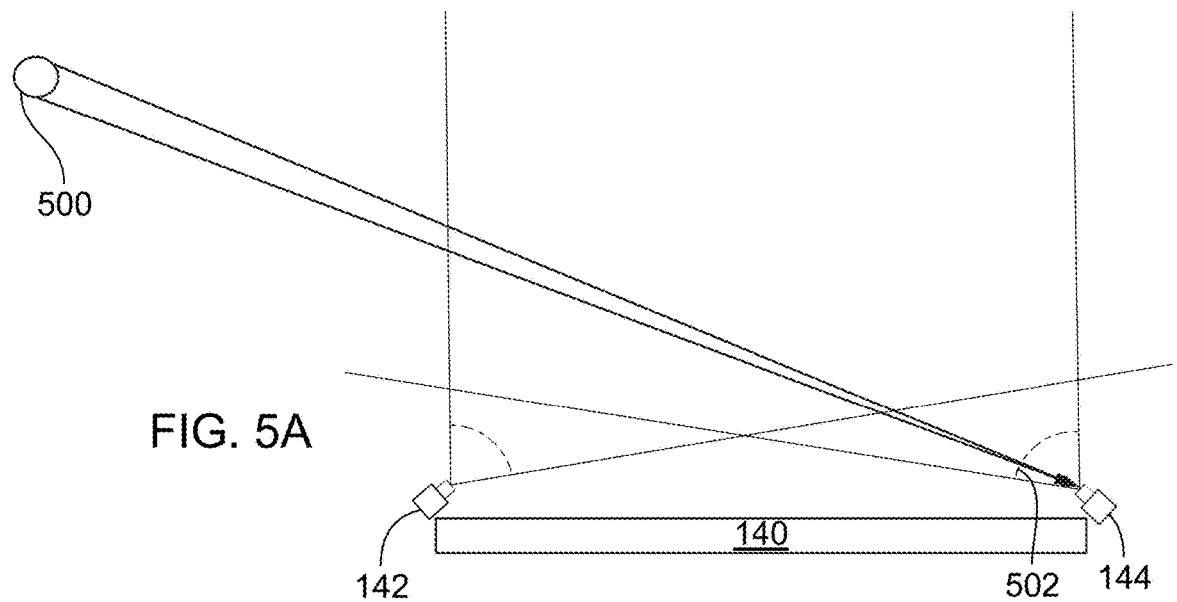
FIGS. 5A-5F show examples of solar blocking devices and results their use.
Figure 5B:
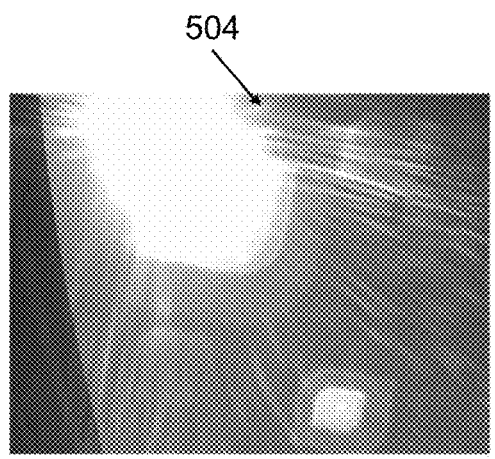

Even with such spectral matching of the light source and the filter, implementations that are deployed outdoors can have problems with finding the projectile in the camera images when the sun is in an image taken by one of the cameras. Thus, in outdoor implementations (with or without spectral matching) a solar block feature can be used to address this issue. FIG. 5A shows an example of a system setup at a time of day when the sun 500 is in the field of view 502 of the camera 144. This situation creates a significant challenge for acquiring images of fast bullets when the camera is directly looking into the bright sun. Normally, cameras under these conditions acquire images that are significantly degraded by solar-induced lens flare. Lens flare is a degradation caused when strong light is scattered within the lens producing image artifacts and glare. The artifacts are strong geometric patterns while glare is an overall brightening of the image. FIG. 5B shows an example of solar artifacts and light scatter 504 that can occur in these types of camera imaging situations. When imaging the sun through the atmosphere, it is noted that the sun's disc is extremely bright; surrounding the sun is scattered light that produces an aura.

Figure 5C:
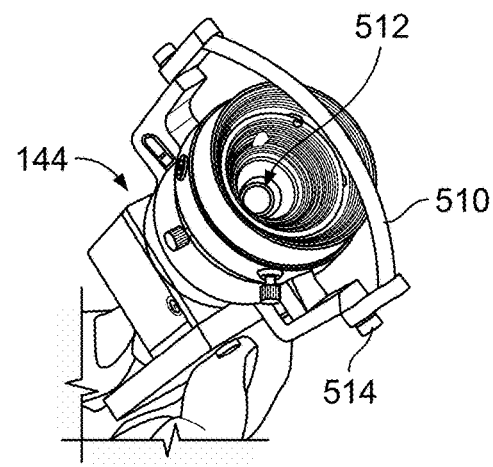

To address this issue and strongly reduce these undesirable effects in image capture, a solar block can be provided. FIG. 5C shows an example a solar blocking device 510 attached to the camera 144. In this example, the solar block 510 is a plastic device that attaches directly to the camera 144 and blocks the direct sunlight that would otherwise enter the lens 512, creating a shadow across the camera as shown in FIG. 5C. The solar block 510 is a thin rod placed in the field of view and is moveable so that it can be placed to block out the sun. The sun has an angular diameter of approximately 0.5 degrees; the angular width of the rod is thus greater than 0.5 degrees to be able to fully occlude the disc of the sun. The rod can be adjusted to be aligned along the sun's apparent path (ecliptic) across the sky. Once positioned, the sun will remain occluded by the rod over the course of a day.

Figure 5D:
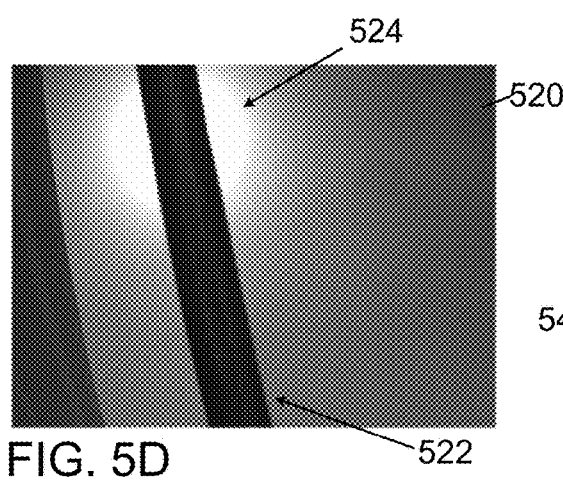

FIG. 5D shows an example of an image 520 taken with the solar block 510 in place. As shown, the image 520 includes the shadow 522 of the solar block 510, but the sun's disc has been obscured. Also, while light scattered by the atmosphere remains, it has much lower intensity (the aura is many times less bright than sun), and the image 520 is devoid of the most problematic solar artifacts and light scatter. Comparing FIG. 5B with FIG. 5D, the unblocked sun image shows significant artifacts, glare, and saturated pixels (the dark area along left edge of both images is a building at the confidential testing location). Thus, placing the solar block so as to occlude the solar disc provides significant reductions in these unwanted effects. The block obscures about 12% of the pixels. There remains a small, saturated region 524 surrounding the sun (caused by atmospheric scattering) but these remaining artifacts compromise the trajectory determination to a much lesser degree.

As noted, the solar block 510 can be set up so the sun tracks along the line (the ecliptic) for the whole day. To achieve this, the solar block 510 has two degrees of freedom of rotation. First, the solar block 510 is rotatable about the optical axis of the camera 144. Second, the solar block 510 includes at least one pivot point 514 that allows an arcuate solar disc blocking piece (as shown) to be rotated about an axis perpendicular to the optical axis of the camera 144. This, arrangement for manual repositioning of the solar block 510 will be sufficient in many implementations.

However, if positioning of the system with respect to the sun's path for the day will cause the bullet to be obscured, i.e., the bullet's track will be substantially along the shadow 522 rather than pass across it, then the sun can be tracked, and the solar block moved as needed in the course of the day. In other words, if the anticipated munition path is not substantially parallel to the sun's apparent path, a solar block device 510 can be used that has a fixed position for the entire day. And in the case where the sun's apparent path and the range of munition possible paths are coincident, a solar block device can be rotated to be substantially perpendicular to the solar path, and the solar block device is motorized to track the solar path. This tracking of the sun can be done by direct observation of the sun (e.g., processing image data from the camera 144 to find the sun in the image) and/or by pulling data from the Internet (e.g., from NOAA.gov) regarding the sun's position and path for the day at the particular location.

Figure 5E:
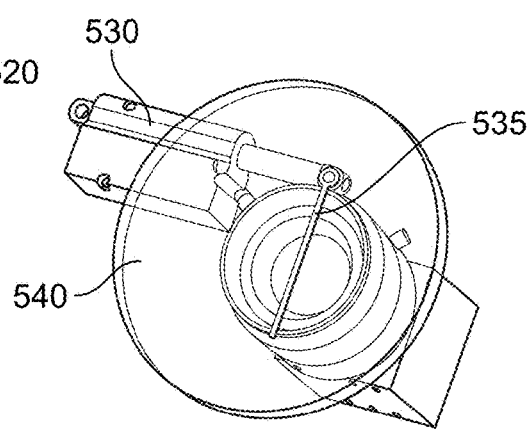

FIG. 5E shows an example of a solar block device 530 that includes a solar blocking piece 535 under a protective window 540 (made of glass or plastic material). The solar block device 530 is motorized such that the solar blocking piece 535 can be moved automatically or by remote operation, e.g., by the computer 170 being programmed to move the solar blocking piece 535 based on solar and system positioning data, or in response to receiving a remote signal that controls movement of the solar blocking piece 535 by the solar block device 530. Thus, the solar block device 530 includes one or more motorized actuators that allow movement of the solar blocking piece 535 to track the sun's movement.

Figure 5F:
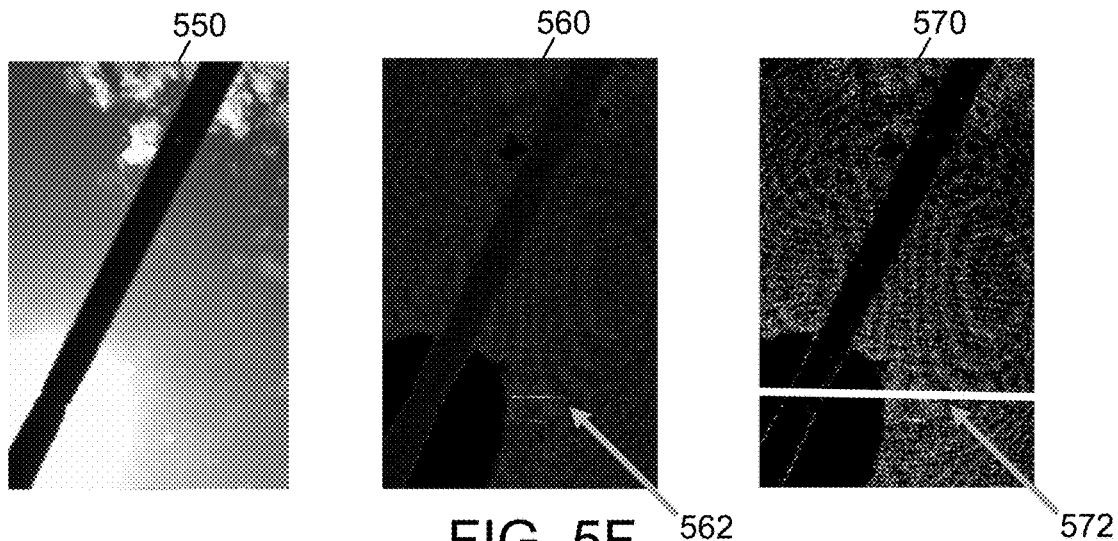

Regardless of whether adjustment of the solar blocking piece is manual or motorized, the projectile trajectory determination is substantially enhanced by the use of the solar block in outdoor implementations. FIG. 5F shows an example of a projectile passing through the aura of the sun. A first image 550 shows the raw data, where the solar disc has been blocked by the solar blocking piece. A second image 560 is the differenced image (a prior or subsequent image without the projectile having been subtracted from the first image 550 after both images have been distortion corrected, e.g., lens aberrations corrected, using the camera's intrinsic parameters) in which the streak artifact 562 of the passing projectile is clearly discernible. Finally, a third image 570 shows the analyzed result, which includes the defined trajectory 572 for the projectile.

In addition, the ballistic detection systems and techniques described in this document can support training exercises that occur in a variety of weather environments, including rain. Thus, in some implementations, the components of the ballistic detection system(s) are built to withstand expected weather conditions, and a camera view clearing mechanism can be included to ensure that adverse environmental conditions, including conditions wherein rain, wind blown dust, or other debris, do not interfere with the capturing of images of the projectile.

Figure 6A:
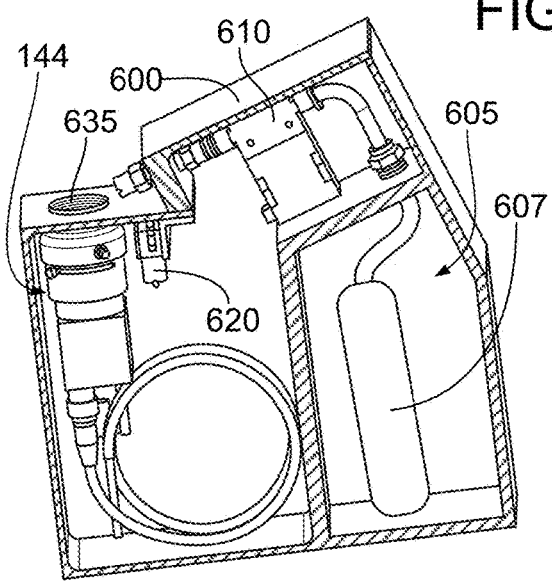
FIGS. 6A-6E show examples of clearing and solar blocking devices used with system cameras.

FIG. 6A shows a cutaway perspective view of an imager housing 600 including a camera 144 and a high pressure clearing device 610 (e.g., 50 pounds per square inch (psi) or higher). In some implementations, the imager housings are individualized to isolate their windows from artificial illumination sources and facilitate localized clearing by pressurized air. The high pressure clearing device 610 enables just-in-time clearing of any water, dust or debris, before the camera 144 needs to take a picture of the projectile. When the incoming projectile is detected, e.g., by radar system 120, a signal is sent to the high pressure clearing device 610 (a gas discharger) to eject a blast of gas (e.g., air, carbon dioxide, or other gas) onto a transparent lens cover 635. In some implementations, the transparent lens cover 635 is glass that has had a treatment applied to increase the surface hydrophobicity and lessen the stiction of the water to the glass surface. In some implementations, the transparent lens cover 635 is raised above the exterior surface of the housing 600 by a small amount 637 (e.g., between a tenth and a fifth of an inch, inclusive) to facilitate the localized clearing by the pressurized air. Raising the transparent lens cover 635 helps to prevent nearby water (between the nozzle and the glass cover) from being drawn (entrained) onto the glass surface by the air stream, and to prevent water collecting on nearby surfaces from draining down and onto the glass surface.

The high pressure blast of air (or other inert gas) can fully clear the transparent lens cover 635 (e.g., a 1 inch diameter glass surface) of any water (e.g., from rain) or dust or debris in less than 16 milliseconds, e.g., clearing can be completed between 2 and 11 milliseconds before taking an image of the projectile in the target volume of detection. Faster times can also be achieved, e.g., full clearing within 14, 12, 10, 9, 8, 7, 6 or 5 milliseconds. The factors that impact the speed of clearing are the speed of the valves, the pressure level of the gas, the length of the tubes/pathways between the gas source and the exit orifice of the nozzle, the nozzle design, and the size, shape and hydrophobicity of the cover. In any case, the imaging of the projectile by the camera 144 is not compromised by the environmental conditions when the camera view clearing mechanism is used.

This provides a significant advantage for the system. By clearing the transparent lens cover 635 immediately before the projectile arrives in the target volume of detection, the fraction of incoming rounds that are successfully detected and have their trajectory determined by the system (the detection rate for the target system) can be increased dramatically when there is rain or blown dust around the system. In some implementations, the detection rate is kept above 98% or 99%, including during a rain storm. Note that this is achieved without using moving structures like a physical wiper, which are more likely to be damaged or need repair than the high pressure clearing device 610. Moreover, by clearing the window 635 on demand, rather than just periodically (which leaves gaps in time) or continuously, the detection rate is improved while minimizing the amount of gas or energy used (less gas is used in implementations that have a fixed gas supply, and less energy is used in implementations that use a compressor with air from the environment). Moreover, the additional components that would be needed to detect when there is water or dust on the transparent lens cover 635 are not needed when a just-in-time gas discharge is triggered by the projectile detector, e.g., the radar system 120.

Note that in some implementations, high rates of fire (ROF), such as 15 rounds per second (rps) or an average of 66 milliseconds between rounds, are supported. The detection time within the system (time required for optical system to detect) can be less than 10 milliseconds. In typical use scenarios, while a short-lived ROF can be 15 rps, it would be typical to have minutes or much more time between shot arrivals. Hence, the need for clearing rates can vary by factors of thousands. By using an on-demand clearing approach, the quantity of gas used is proportional to the number of incoming rounds instead of being proportional to the length of time the system operates. Since no gas is used unless a round is detected, the high-pressure gas usage is minimized and allows a system to use a pre-charged gas reservoir, such as a high-pressure air tank or a $CO_2$ cartridge. In some implementations, an air compressor is used to generate high pressure air on demand—in this case the low usage rate would allow a smaller compressor to be used.

Figure 6B:
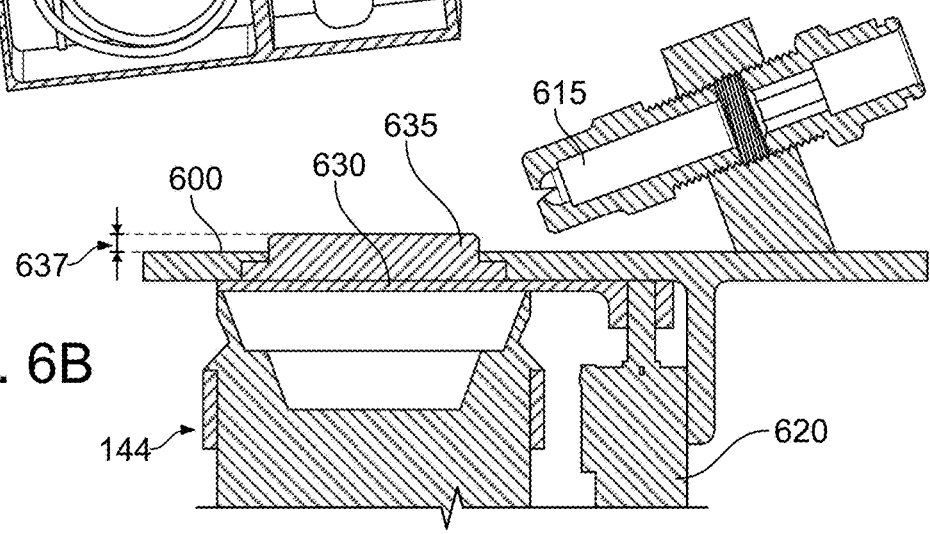

Also shown is a space 605 in which a high pressure gas source can be placed and attached to the high pressure clearing device 610. This gas source can be a cartridge 607 or reservoir containing the gas (e.g., liquid carbon dioxide) or a compressor, as noted above. In addition, this example includes an actuator 620 of a solar block device 630 for the camera 144. FIG. 6B is a cross sectional view of the transparent lens cover 635 for the camera 144, a nozzle 615 for the high pressure clearing device 610, and the solar block device 630 that is moved by the actuator 620.

As will be appreciated, the same type of gas discharger can be used with camera 142. Thus, the system can actively clear water or debris accumulating on the optical windows for the cameras on both sides of the target volume of detection, on demand when an incoming round is detected. This on-demand pre-emptive high-pressure air clearing approach means the optics need only be cleared when a measurement is being made. With a sufficiently fast-acting clearing system in place, the same trigger that initiates the measurement system can also pre-emptively initiate optic clearing immediately prior to the optical data acquisition. This eliminates the need for a direct rain/debris detection system. In addition, as noted above, each side of the electromagnetic radiation detection equipment 140 can include more than one camera with a different orientation to increase the size of the target volume of detection and/or to limit the range of angles of incident light to be handled in the image processing.

Figure 6C:
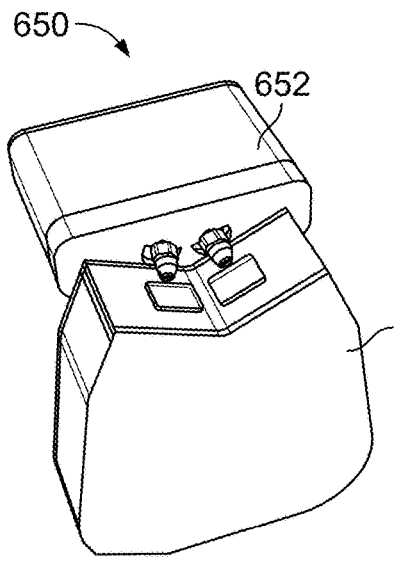
Figure 6E:
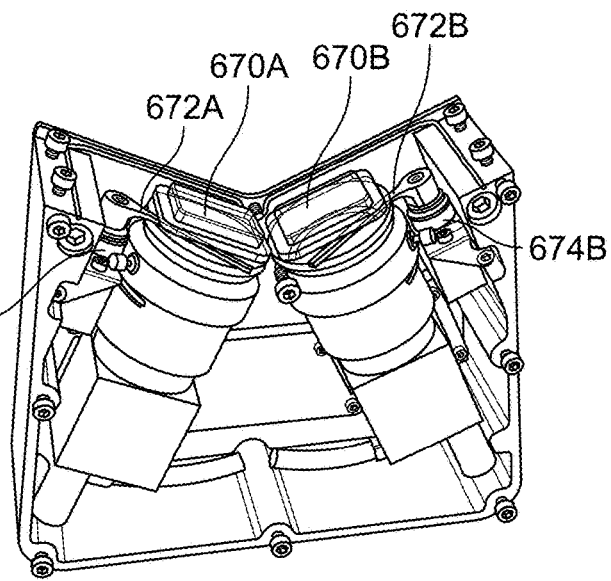
Figure 6D:
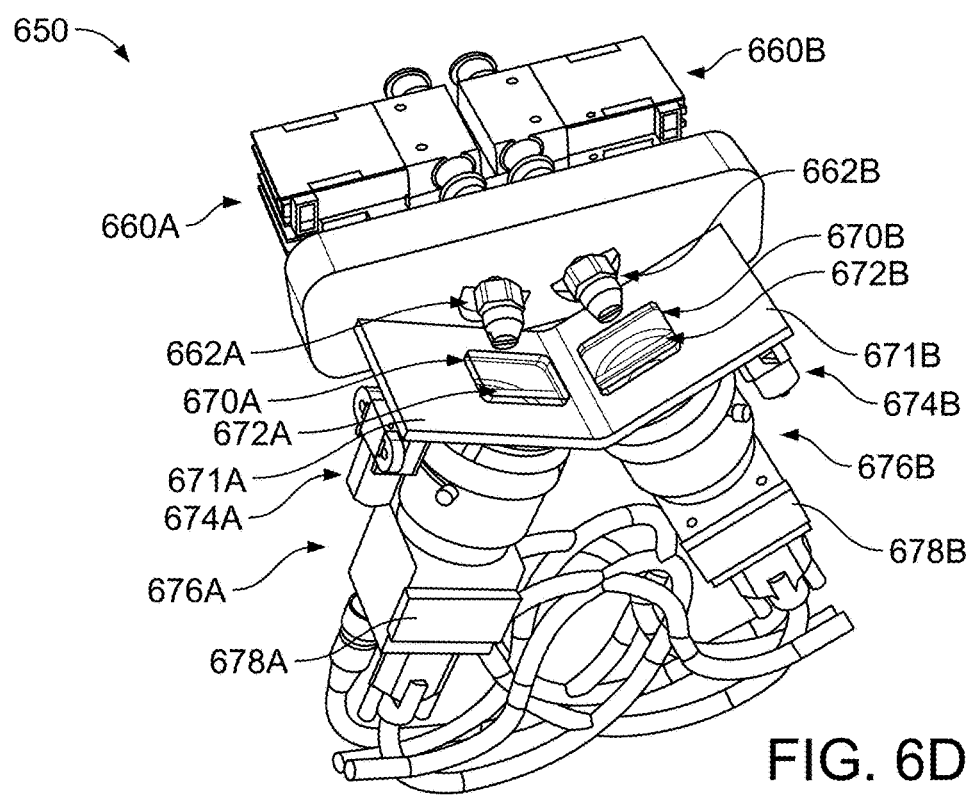

FIGS. 6C-6E show another example of a water clearing device 650. FIG. 6C shows examples of enclosures 652, 654 for the components of the water clearing device 650, and FIGS. 6D and 6E show examples of the components therein. In this example, two cameras 676A, 676B are used on one side of the electromagnetic radiation detection equipment 140 and have different orientation to increase the size of the target volume of detection and/or to limit the range of angles of incident light to be handled in the image processing. In some implementations, each camera 676A, 676B has an attached Peltier cooler 678A, 678B to keep the camera from overheating in a hot environment (e.g., at a dessert training facility). Note that other components in the system, such as the computer(s)/controller(s) 170 can also have dedicated cooling devices. In addition, each camera 676A, 676B has an associated solar block 672A, 672B that is operated using a corresponding solar block actuator 674A, 674B.

But regardless of whether or not Peltier cooler 678A, 678B and/or solar blocks 672A, 672B are used, each camera 676A, 676B has an associated nozzle 662A, 662B directed at its transparent cover 670A, 670B, which can each rise above (e.g., by 0.1 to 0.2 inches) the outer surface 671A, 671B of the enclosure for the corresponding camera 676A, 676B. Each nozzle 662A, 662B is coupled with a corresponding high speed valve 660A, 660B, where high speed here corresponds to opening in about 1.6 milliseconds, e.g., the Festo MHJ9 available from Esslingen am Neckar, Germany. Other components can also be used in various implementations.

In addition to military and police use, the described systems and techniques can be used in a number of applications, including as a commercial target system for recreational and competitive shooting sports. Shooting sports are a widely enjoyed recreational, and competitive activities embrace many forms of marksmanship. Both recreational shooting as well as organized disciplines would benefit from a low cost, adaptable electronic point-of-impact/scoring system. Adaptability is an important attribute of such a technology as it should support and be scalable to such diverse applications as 1000 yard F-class centerfire, rimfire benchrest at 50 yards, Bullseye pistol at 25 and 50 yards, or 10 meter air rifle/pistol.

A precise, real-time target system would have many benefits. It would enable more precise scoring with much less manual effort, allow for greater spectator involvement and excitement, and lead to increasing popularity. A precise and low cost system would allow smaller clubs, ranges, and individuals to access precise and real-time shot placement information for sighting in, load development, testing and characterization, practice, and informal or local competitions. In turn these lead to greater interest and growth of the shooting sports with follow-on advancements in equipment and techniques. Law enforcement training and qualification can benefit by better and automated shot location detection. Greater enjoyment of shooting benefits civilian marksmanship, promotes stewards of safety and advocacy, advances a camaraderie that enhances the family environment, and increases the confidence, self-discipline, and self-esteem of youth.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, special purpose microprocessors. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiments described above can be combined with any of the other features of the embodiments described above.

Similarly, while operations are depicted in the drawings in a particular order, this should not be understood as requiring that such operations be performed in the particular order shown or in sequential order, or that all illustrated operations be performed, to achieve desirable results. For example, the transformations 242, 244 can be performed before the identification 240, and the transformations 272, 274 can be performed before the identification 270. Thus, particular embodiments of the invention have been described. Other implementations are also possible. For example, in some implementations, a distinct projectile detector (radar based or otherwise) is not included in the system, a continuous series of images is taken by the cameras, and each set of images is analyzed to identify projectiles and determine their trajectories.

What is claimed is:
1. A ballistic detection system comprising:
a projectile detector;
electromagnetic radiation detection equipment communicatively coupled with the projectile detector, the electromagnetic radiation detection equipment comprising
  a first camera arranged with respect to a target volume to view the target volume from a first perspective defined by a first position and a first orientation of the first camera, and
  a second camera arranged with respect to the target volume to view the target volume from a second perspective, the second perspective defined by a second position and a second orientation of the second camera; and
a ballistics analysis computer communicatively coupled with the electromagnetic radiation detection equipment, wherein the ballistics analysis computer is configured to
obtain image data captured by the first and second cameras in accordance with timing specified by the projectile detector,
determine at least two points in three-dimensional space using intrinsic and extrinsic parameters of the first and second cameras by being configured to
  identify image artifacts of a projectile in the image data including at least two image locations in each of a first set of one or more images from the first camera and a second set of one or more images from the second camera, wherein each of the at least two image locations correspond to a different time, the intrinsic parameters of the first camera characterize transformation between image plane coordinates and pixel coordinates for the first camera, the intrinsic parameters of the second camera characterize transformation between image plane coordinates and pixel coordinates for the second camera, and the extrinsic parameters of the first and second cameras relate the first perspective and the second perspective to each other,
  transform the at least two image locations in the first set of one or more images into respective two dimensional coordinates in the image plane of the first camera using the intrinsic parameters of the first camera,
  transform the at least two image locations in the second set of one or more images into respective two dimensional coordinates in the image plane of the second camera using the intrinsic parameters of the second camera,
  find a first point of the at least two points in three-dimensional space using a first of the two dimensional coordinates in the image plane of the first camera, a first of the two dimensional coordinates in the image plane of the second camera, and the extrinsic parameters of the first and second cameras in relation to the position and orientation of one or both of the first and second cameras in three-dimensional space, and
  find a second point of the at least two points in three-dimensional space using a second of the two dimensional coordinates in the image plane of the first camera, a second of the two dimensional coordinates in the image plane of the second camera, and the extrinsic parameters of the first and second cameras in relation to the position and orientation of one or both of the first and second cameras in three-dimensional space; and
define a trajectory of the projectile within the target volume using the at least two points in three-dimensional space by being configured to define a direction of the projectile as coincident with a line connecting the first point with the second point.

2. The ballistic detection system of claim 1, wherein the first set of one or more images is a single first image from the first camera, the second set of one or more images is a single second image from the second camera, and the at least two image locations are a beginning location and an ending location of a streak of image artifacts in each of the single first image and the single second image.

3. The ballistic detection system of claim 1, wherein the first set of one or more images is at least two first images, the second set of one or more images is at least two second images, and the at least two image locations are first locations of image artifacts in respective ones of the at least two first images and second locations of image artifacts in respective ones of the at least two second images.

4. The ballistic detection system of claim 1, wherein the ballistics analysis computer is configured to define a speed of the projectile using radar data, using a distance between the first point and the second point in three-dimensional space divided by a difference between a time of the first point and a time of the second point, or using both the radar data and the distance.

5. The ballistic detection system of claim 1, wherein the first camera has a first circular buffer, the second camera has a second circular buffer, the ballistics analysis computer comprises a projectile detector analysis computer and a trajectory analysis computer, and the projectile detector comprises a radar system that comprises:
at least one antenna; and
the projectile detector analysis computer configured to stop image capturing by the first and second cameras, and to trigger obtaining of the image data from the first and second circular buffers for processing by the trajectory analysis computer, in response to the timing being calculated from signals from the at least one antenna.

6. The ballistic detection system of claim 1, wherein the ballistics analysis computer is configured to find a point of intersection of the trajectory of the projectile with an object associated with the target volume as a point of impact of the projectile with a target surface of the object.

7. The ballistic detection system of claim 6, wherein the object is a physical target having a three-dimensional shape, and the target surface is a three-dimensional surface of the physical target.

8. The ballistic detection system of claim 1, comprising gas dischargers arranged proximate to respective ones of the first and second cameras, wherein the gas dischargers are configured to eject a blast of gas onto respective transparent lens covers for the first and second cameras in accordance with the timing specified by the projectile detector to clear the transparent lens covers of water, dust or other debris, and each of the gas dischargers comprises a high speed valve coupled between a nozzle and a gas source.

9. A ballistic detection system comprising:
a projectile detector;
electromagnetic radiation detection equipment communicatively coupled with the projectile detector, the electromagnetic radiation detection equipment comprising
a first camera arranged with respect to a target volume to view the target volume from a first perspective defined by a first position and a first orientation of the first camera, and
a second camera arranged with respect to the target volume to view the target volume from a second perspective, the second perspective defined by a second position and a second orientation of the second camera; and
a ballistics analysis computer communicatively coupled with the electromagnetic radiation detection equipment, wherein the ballistics analysis computer is configured to
obtain image data captured by the first and second cameras in accordance with timing specified by the projectile detector,
determine at least two points in three-dimensional space using intrinsic and extrinsic parameters of the first and second cameras by being configured to
identify image artifacts of a projectile in the image data including a stripe in each of a first set of one or more images from the first camera and a second set of one or more images from the second camera, wherein the intrinsic parameters of the first camera characterize transformation between image plane coordinates and pixel coordinates for the first camera, the intrinsic parameters of the second camera characterize transformation between image plane coordinates and pixel coordinates for the second camera, and the extrinsic parameters of the first and second cameras relate the first perspective and the second perspective to each other,
transform the stripe in the first set of one or more images into a line in the image plane of the first camera using the intrinsic parameters of the first camera,
convert the line in the image plane of the first camera into a first plane,
transform the stripe in the second set of one or more images into a line in the image plane of the second camera using the intrinsic parameters of the second camera,
convert the line in the image plane of the second camera into a second plane, and
intersect the first plane and the second plane to form a line in three-dimensional space that includes the at least two points; and
define a trajectory of the projectile within the target volume using the at least two points in three-dimensional space by being configured to
define a direction of the projectile as coincident with the line in three-dimensional space, and
define a speed of the projectile using the image data, radar data, or both.

10. The ballistic detection system of claim 9, wherein the stripe in each of the first set of one or more images from the first camera and the second set of one or more images from the second camera is an image streak corresponding to the projectile.

11. The ballistic detection system of claim 9, wherein the stripe in each of the first set of one or more images from the first camera and the second set of one or more images from the second camera is a series of image impressions corresponding to the projectile.

12. The ballistic detection system of claim 9, comprising gas dischargers arranged proximate to respective ones of the first and second cameras, wherein the gas dischargers are configured to eject a blast of gas onto respective transparent lens covers for the first and second cameras in accordance with the timing specified by the projectile detector to clear the transparent lens covers of water, dust or other debris, and each of the gas dischargers comprises a high speed valve coupled between a nozzle and a gas source.

13. The ballistic detection system of claim 9, wherein the ballistics analysis computer is configured to find a point of intersection of the trajectory of the projectile with an object associated with the target volume as a point of impact of the projectile with a target surface of the object.

14. A ballistic detection system comprising:
a projectile detector;
electromagnetic radiation detection equipment communicatively coupled with the projectile detector, wherein the electromagnetic radiation detection equipment comprises
a first camera arranged with respect to a target volume to view the target volume from a first perspective defined by a first position and a first orientation of the first camera,
a second camera arranged with respect to the target volume to view the target volume from a second perspective, the second perspective defined by a second position and a second orientation of the second camera,
a lighting system comprising one or more light emitters configured and arranged to illuminate the target volume with light having a first bandwidth straddling a first wavelength, and
a passband filter between the target volume and an image sensor of each of the first and second cameras, wherein the passband filter has a second bandwidth straddling a second wavelength, the second wavelength is included in the first bandwidth straddling the first wavelength, and the second bandwidth is smaller than first bandwidth;
a ballistics analysis computer communicatively coupled with the electromagnetic radiation detection equipment, wherein the ballistics analysis computer is configured to
obtain image data captured by the first and second cameras in accordance with timing specified by the projectile detector,
determine at least two points in three-dimensional space using intrinsic and extrinsic parameters of the first and second cameras, wherein the at least two points in three-dimensional space correspond to image artifacts of a projectile detected in the image data, the intrinsic parameters of the first camera characterize transformation between image plane coordinates and pixel coordinates for the first camera, the intrinsic parameters of the second camera characterize transformation between image plane coordinates and pixel coordinates for the second camera, and the extrinsic parameters of the first and second cameras relate the first perspective and the second perspective to each other,
define a trajectory of the projectile within the target volume using the at least two points in three-dimensional space, and
find a point of intersection of the trajectory of the projectile with an object associated with the target volume.

15. The ballistic detection system of claim 14, wherein the first bandwidth is wider than the second bandwidth by an amount selected to account for shifting of light emission spectrum of the one or more light emitters that results from variations in temperature, shifting of light filtering spectrum of the passband filter that results from variations in angle of light incidence, or both.

16. The ballistic detection system of claim 15, wherein at least one camera of the first and second cameras has an associated device configured and arranged to block a solar disc in a field of view of the one camera.

17. The ballistic detection system of claim 16, wherein the device comprises an arcuate solar disc blocking piece attached at a pivot point that provides a first axis of rotation perpendicular to an optical axis of the at least one camera, wherein the device has a second axis of rotation parallel with the optical axis of the at least one camera, and a position of the arcuate solar disc blocking piece is adjustable by rotations about the first and second axes to align the arcuate solar disc blocking piece with an ecliptic of the sun in relation to a lens of the at least one camera.

18. The ballistic detection system of claim 16, wherein the device comprises a motorized actuator coupled with a solar blocking piece, and the motorized actuator is configured to move the solar blocking piece into a position that blocks solar disc light from entering a lens of the at least one camera.

19. The ballistic detection system of claim 15, wherein the projectile detector comprises a radar system, and the lighting system is configured to cause the one or more light emitters to illuminate the target volume with light in accordance with timing specified by radar data from the radar system.

20. The ballistic detection system of claim 19, wherein the one or more light emitters comprise light emitting diodes, and the lighting system comprises at least one reflector configured and arranged to at least partially collimate light emitted by the light emitting diodes.

* * * * *